(12) United States Patent
Kuramatsu

(10) Patent No.: US 7,050,037 B1
(45) Date of Patent: May 23, 2006

(54) COMMUNICATION TERMINAL DEVICE

(75) Inventor: Hiroyasu Kuramatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 614 days.

(21) Appl. No.: 09/685,770

(22) Filed: Oct. 11, 2000

(30) Foreign Application Priority Data

Oct. 12, 1999 (JP) ................. 11/289071

(51) Int. Cl.
*G09G 3/36* (2006.01)

(52) U.S. Cl. ............... 345/102; 345/211; 455/566; 340/825.72

(58) Field of Classification Search ........... 345/104, 345/82, 170, 169, 760, 76, 212, 213, 83, 345/695, 211, 158, 102, 690; 455/466, 564, 455/566; 370/401, 352, 465; 341/22; 379/368, 379/433, 433.04; 340/825.44, 825.172, 825.19, 340/825.72; 359/143
See application file for complete search history.

(56) References Cited

U.S. PATENT DOCUMENTS

| | | | | |
|---|---|---|---|---|
| 5,077,784 A * | 12/1991 | Fujita et al. | ............... | 348/14.05 |
| 5,548,832 A * | 8/1996 | Karam | ............... | 455/226.4 |
| 5,751,760 A * | 5/1998 | Fuller et al. | ............... | 379/211.01 |
| 5,894,298 A * | 4/1999 | Hoeksma | ............... | 345/102 |
| 5,970,419 A | 10/1999 | Terashima et al. | | |
| 5,999,827 A * | 12/1999 | Sudo et al. | ............... | 455/564 |
| 6,046,730 A * | 4/2000 | Bowen et al. | ............... | 345/168 |
| 6,122,484 A * | 9/2000 | Fuller et al. | ............... | 340/7.28 |
| 6,157,849 A * | 12/2000 | Cho | ............... | 455/566 |
| 6,185,535 B1 * | 2/2001 | Hedin et al. | ............... | 704/270 |
| 6,278,887 B1 * | 8/2001 | Son et al. | ............... | 455/566 |
| 6,310,609 B1 * | 10/2001 | Morgenthaler | ............... | 345/170 |
| 6,341,133 B1 * | 1/2002 | Kawamoto et al. | ............... | 370/401 |
| 6,373,397 B1 * | 4/2002 | Song | ............... | 340/815.4 |
| 6,373,501 B1 * | 4/2002 | Fiero | ............... | 345/700 |
| 6,426,736 B1 * | 7/2002 | Ishihara | ............... | 345/102 |
| 6,446,096 B1 * | 9/2002 | Holland et al. | ............... | 707/513 |
| 6,473,609 B1 * | 10/2002 | Schwartz et al. | ............... | 455/406 |
| 6,523,062 B1 * | 2/2003 | Bridgman et al. | ............... | 709/203 |
| 6,594,484 B1 * | 7/2003 | Hitchings, Jr. | ............... | 455/414.1 |
| 6,597,339 B1 * | 7/2003 | Ogawa | ............... | 345/102 |
| 6,630,914 B1 * | 10/2003 | Tamekuni et al. | ............... | 345/8 |
| 2003/0197719 A1 * | 10/2003 | Lincke et al. | ............... | 345/710 |

FOREIGN PATENT DOCUMENTS

| | | |
|---|---|---|
| JP | 05 19913 A | 1/1993 |
| JP | 05-344022 | 12/1993 |
| JP | 9-261319 | 10/1997 |
| JP | 10-126285 A | 5/1998 |
| JP | 10-200615 A | 7/1998 |
| JP | 2891935 | 2/1999 |
| JP | 11-184782 A | 7/1999 |
| JP | 2000-267685 | 9/2000 |

* cited by examiner

*Primary Examiner*—Henry N. Tran
(74) *Attorney, Agent, or Firm*—Sughrue Mion, PLLC

(57) ABSTRACT

A communication terminal device including a light-emitting unit for lighting at least either a display unit or an input unit, a reception unit for receiving contents data described in a predetermined information description language based on operation information, a code detection unit for detecting a predetermined code indicative of the end of contents data received by the reception unit, and a light-emission control unit for stopping light-emission by the light-emitting unit upon start of the reception of the contents data by the reception unit and starting light-emission by the light-emitting unit upon detection of the predetermined code by the code detection unit.

30 Claims, 13 Drawing Sheets

FIG. 5

```
<HTML>
<HEAD>
<TITLE>PROFESSIONAL BASEBALL NEWS</TITLE>
</HEAD>

<body>
◎GIANTS VS. TIGERS, 13TH GAME
<br><font face="MS GOTHIC"> 1 2 3 4 5 6 7 8 9 R</font>
<br><font face="MS GOTHIC">T 0 0 0 1 2 0 1 0 0 4</font>
<br><font face="MS GOTHIC">G 2 0 3 0 0 0 1 0 X 6</font>
<p>GIANTS VS. TIGERS, 6 TO 4 WON BY GIANTS OWING TO GOOD JOBDONE
BY PITCHING AND HITTING LEADING ROLES, GIANTS WON VALUABLE FIRST
OF SIX SUCCESSIVE GAMES. IN THE THIRD INNING, MATSUI HIT 38TH HOME
 RUN MAKING HIS 200TH. IN THE SEVENTH INNING WITH TIGERS ONE RUN
BEHIND ·······················································
································································
································································
······ DRAGONS, LEADING THE LEAGUE, ALSO WON OVER CARP TO REDUCE
MAGIC TO 10 BUT GIANTS DOES NOT LOSE EAGERNESS TO WIN A COME-FROM
-BEHIND VICTORY.
<br> 
</body>
</HTML>
```

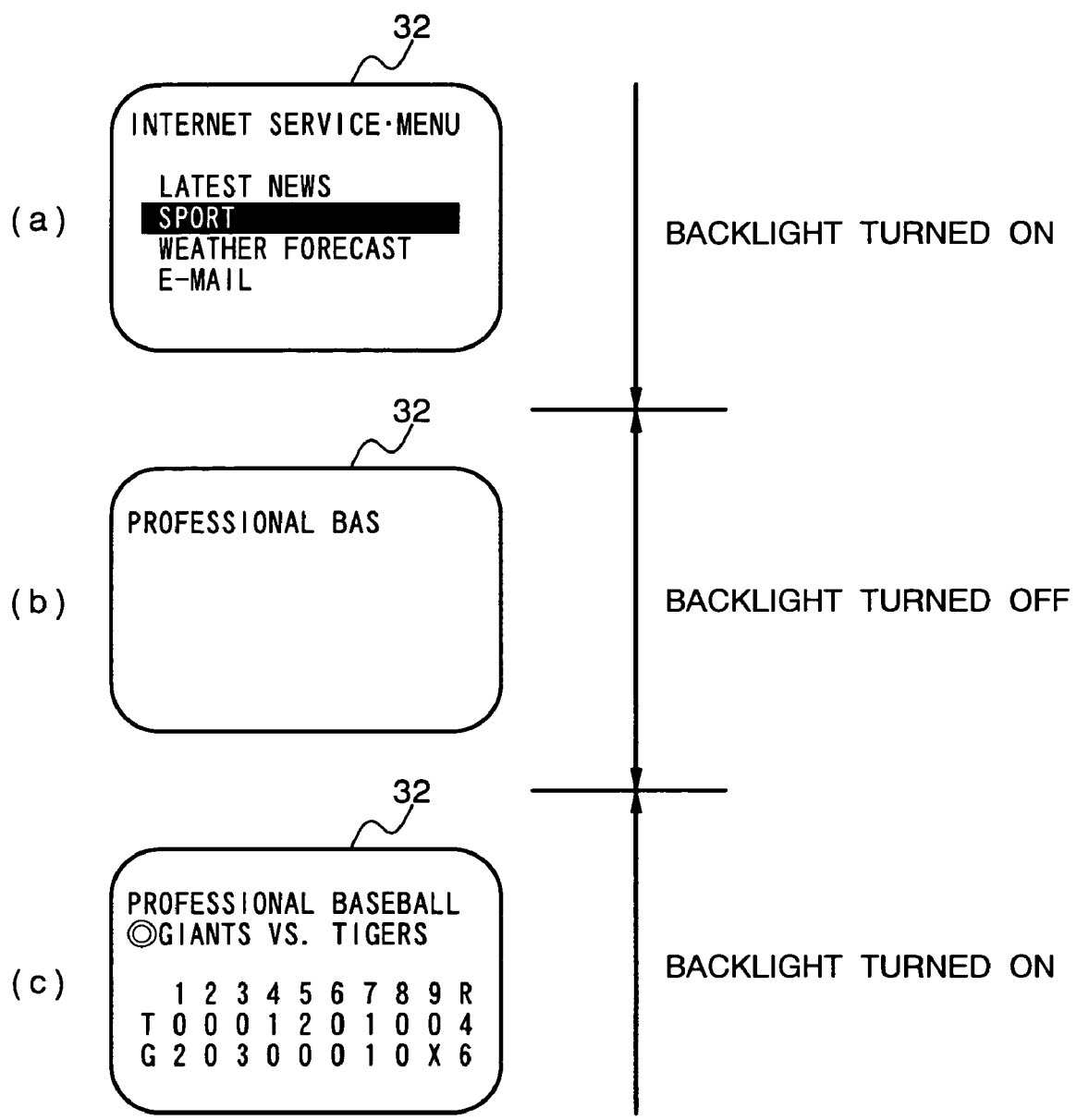

FIG. 8

```
<wml>
  <card>
    <p>
    <do type="accept">
      <go href="#card2"/>
    </do>
    ◎GIANTS VS. TIGERS 1 2 3 4 5 6 7 8 9 R
    T   0 0 0 1 2 0 1 0 0 4
    G   2 0 3 0 0 0 1 0 X 6
    [WINNER] UEHARA
    [SAVE] KUWATA
    [LOSER] FUNAKI
    [HOME RUN] MATSUI [G], TAIHO [T], TSUBOI [T], MATSUI [G]
    </p>
  </card>

<card id="card2">
    <p>
    <do type="accept">
      <go href="#card3"/>
    </do>
    GIANTS VS. TIGERS, 6 TO 4 WON BY GIANTS OWING TO GOOD JOB DONE
     BY PITCHING AND HITTING LEADING ROLES, GIANTS WON VALUABLE
    FIRST OF SIX SUCCESSIVE GAMES. IN THE THIRD INNING, MATSUI HIT
     38TH HOME RUN MAKING HIS 200TH. IN THE SEVENTH INNING WITH
    TIGERS ONE RUN BEHIND ·······································
    ················································
    ················································
    ··· DRAGONS, LEADING THE LEAGUE, ALSO WON OVER CARP TO REDUCE
    MAGIC TO 10 BUT GIANTS DOES NOT LOSE EAGERNESS TO WIN A COME-
    FROM-BEHIND VICTORY.
    </p>
  </card>

<card id="card3">
    <p>
    RESULTS OF OTHER GAMES
    ◎SWALLOWS VS. BAY STARS
    [SUSPENDED]

◎DRAGONS VS. CARP 1 2 3 4 5 6 7 8 9 R
    C   0 0 0 0 0 0 0 0 0 0
    D   0 0 0 1 2 2 3 0 X 8
    [WINNER] NOGUCHI
    [LOSER] K. TAKAHASHI
    [HOME RUN] YAMAZAKI [D]
    </p>
  </card>
</wml>
```

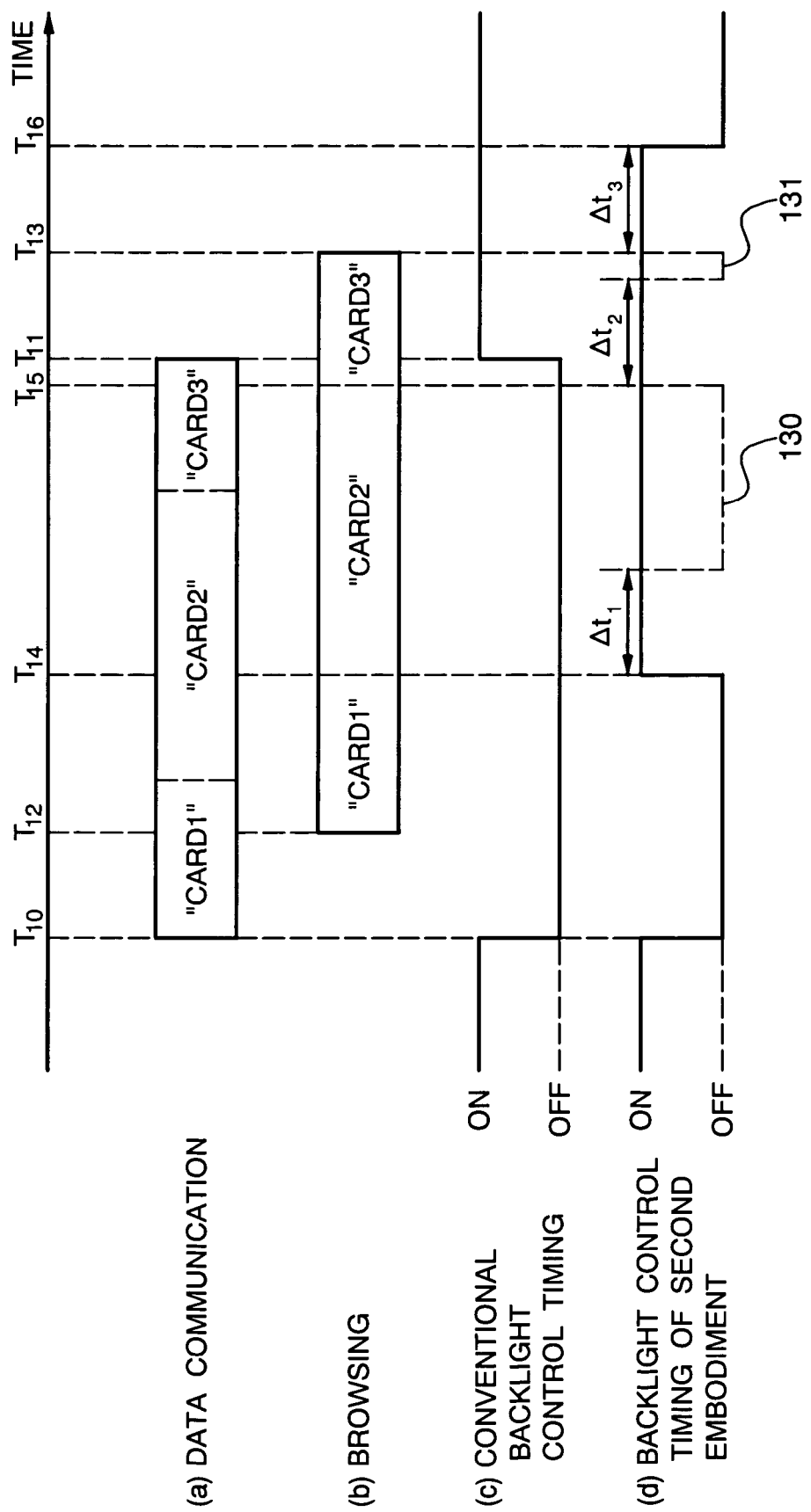

COMMUNICATION TERMINAL DEVICE

BACKGROUND OF THE INVENTION

1. Field of the Invention

The present invention relates to a communication terminal device and, more particularly, to a communication terminal device whose power consumption is reduced, for example, by controlling a backlight function of a display unit or the like.

2. Description of the Related Art

With recent advances in data communication techniques, integration techniques and packaging techniques, improvement in performance and reduction in size and weight of communication terminal devices have been accelerated. Typical of such devices are, for example, a portable telephone capable of conducting voice transmission and reception by mobile radio communication and a portable information terminal capable of reading various kinds of contents on the Internet in which computer networks are connected to each other. Among these communication terminal devices, portable telephones in particular have been enjoying a remarkable spread to provide various kinds of data communication services such as sending and receiving of electronic mail by accessing a data communication network such as the Internet and reading of contents. With communication terminal devices, therefore, users have more chances to use electronic mail service and contents reading other than ordinary mobile telephone services to have more and more chances of using data communication.

Under these circumstances, although with the progress in integration techniques and packaging techniques, reduction in power consumption of communication terminal devices has been enhanced as described above, a small-sized battery capacity hinders the reduction, so that time allowed to use the devices is inevitably shortened. Further reduction is strongly demanded in power consumption of communication terminal devices driven by batteries.

In general, communication terminal devices consume large part of electric power in a radio communication function and a backlight function or a sidelight function for lighting a liquid crystal display (hereinafter referred to as LCD) as a display unit or a switch (hereinafter referred to as SW). Therefore, reducing power consumption in both of these functions will be effective measures for low power consumption. As these measures, various techniques have been proposed related to, for example, lighting control of a backlight or a sidelight. In such a backlight function or a sidelight function, the higher the frequency of the above-described data communication becomes, the more the power is consumed because users' time of watching an LCD is increased. Accordingly, by appropriately controlling these functions, reduction in power consumption can be more efficiently achieved.

FIG. 14 shows an outline of a structure of a communication terminal device which conducts conventionally proposed backlight control. Assume here that the communication terminal device is a portable telephone. The communication terminal device includes an SW10 for receiving input of various kinds of instructions to the device as operation information, an operation detection unit 11 for detecting operation input by the SW10, a backlight 12 for lighting an LCD as a display unit not shown, a driver 13 for driving the backlight 12, a timer unit 14 for counting a lighting time of the backlight 12, a call detection unit 15 for detecting the communication terminal device being on the phone or not, and a control unit 16 for controlling each unit of the communication terminal device.

The control unit 16 of such a communication terminal device as described above is designed to have a central processing unit (hereinafter referred to as CPU) not shown to execute lighting control of the backlight 12 based on a control program stored in a predetermined storage device such as a read only memory (hereinafter referred to as ROM).

FIG. 15 shows an outline of processing contents of a control program stored in a predetermined storage device of the control unit 16. Prior to the processing by the control program, a predetermined backlight lighting time is set at the timer unit 14 in advance and a lapse of the backlight lighting time is notified as time out. First, the control unit 16 controls the operation detection unit 11 to monitor operation/non-operation by the SW10 (Step S20: N) and when the operation is detected (Step S20: Y), sends out a control signal to the driver 13 to light the LCD not shown which is to be displayed according to predetermined display information and start lighting of the backlight 12 (Step S21), as well as starting counting the timer unit 14. Subsequently, the control unit 16 controls the call detection unit 15 to detect the communication terminal device being on the phone or not (Step S22) and when detecting the device being not on the phone (Steps S22: N), determine whether time out is notified which indicates that the time counted by the timer unit 14 overs the above-described backlight lighting time (Step S23). If no determination is made here that time out is notified (Step S23: N), return to Step S22 to detect the communication terminal device being on the phone or not again. When at Step S23 the determination is made that time out is notified (Step S23: Y), turn off the backlight 12 through the driver 13 (Step S24) and return to Step S20 to monitor the SW operation again (return).

When at Step S22 the communication terminal device is detected being on the phone by the call detection unit 15 (Step S22: Y), turn off the backlight 12 through the driver 13 (Step S25). Subsequently, monitor completion/incompletion of the being on the phone state detected by the call detection unit 15 at Step S22 (Step S26: N) and when the completion is detected (Step S26: Y), return to Step S21 to again turn on the backlight 12 through the driver 13.

Thus, when operation by the SW10 is detected by the operation detection unit 11, monitor a start of a call and when the start is not detected, turn off the backlight after a lapse of a predetermined backlight lighting time. In addition, when the start of a call is detected, turn off the backlight immediately and upon completion of the call, turn on the backlight again. Such arrangement prevents wasteful consumption of battery power by turning off the backlight during a call when neither the SW10 nor the LCD not shown can be visually observed.

One of such techniques related to communication terminal devices as described above is disclosed, for example, in Japanese Patent No. 2891935, entitled "Portable Telephone Set".

According to a technique related to a communication terminal device which conducts backlight lighting control disclosed in, for example, Japanese patent Laying-Open (Kokai) No. Heisei 5-344022, entitled "Portable Data Communication Device", after data communication is started, first a backlight lighting flag is reset to check whether the backlight is lighting or not at that time point and when it is lighting, the backlight lighting flag is set and once stored in a memory. Thereafter, turn off the backlight and after the data communication is finished, the backlight is turned on according to the backlight lighting flag stored in the memory.

As described in the foregoing, recent communication terminal devices enable not only conventional "call" by voice but also reception of data of contents described in a predetermined information description language such as a hypertext markup language (hereinafter referred to as HTML) by a direct access to the Internet and reading of the contents on a display screen such as an LCD. Typical of such devices are, for example, "i-mode" by NTT DoCoMo Inc. and a wireless application protocol (hereinafter referred to as WAP) system. Communication terminal devices for use in such systems include a CPU having high processing power and execute a browsing function for reading contents data described in Compact HTML similar to HTML or wireless markup language (hereinafter referred to as WML). Also for a communication terminal device having such a browsing function, the above-described backlight lighting control, rather than lighting of the backlight all the time after communication is started, is effective in reducing power consumption of the device.

However, in the communication terminal device shown in FIG. 14, the backlight is turned on upon completion of a call and in the communication terminal device to which the technique disclosed in Japanese Patent Laying-Open (Kokai) No. Heisei 5-344022 is applied, if the backlight is lighting at the start of communication, the backlight is turned on upon completion of the communication. In a case of the above-described communication terminal device which executes a browsing function, however, there is a time difference between the end of the communication function and the end of processing of data readable on the display unit such as an LCD through execution of the browsing function, so that there occurs a case where even if the backlight is turned on as soon as the communication function ends, no readable contents are displayed on the display unit. In other words, since the device is designed to turn on the backlight immediately upon completion of the communication function, from the time of turn-on of the backlight until when contents are made readable on the display unit by the browsing function, useless electric current for lighting the backlight will be consumed.

On the other hand, in a WAP system, communication is conducted based on a transmission and reception unit called "DECK" made up of a plurality of small contents called "CARD" in order to increase communication efficiency. Assuming, for example, that three screens of "CARD" approximately equivalent to one screen on the display unit of the communication terminal device make one "DECK", reception of three screens of contents data is conducted by one communication. With the communication terminal device shown in FIG. 14 and the communication terminal device to which the technique disclosed in Japanese Patent Laying-Open No. Heisei 5-344022, accordingly, although the contents of the first screen are received and browsing as data processing is finished by the browsing function to complete a screen to be displayed on the display unit such as an LCD, no backlight lighting is conducted unless reception of all the contents of three screens is completed. Until then, no user is allowed to read the contents. In other words, reducing a lower consumption results in degrading users' ease of use and therefore demanded is a communication terminal device whose power consumption is reduced appropriately without degrading users' ease of use.

SUMMARY OF THE INVENTION

An object of the present invention is to provide a communication terminal device whose wasteful power consumption is cut down even when received data can not be displayed on a display unit immediately after the end of a communication function because of a browsing function for conducting predetermined browsing processing with respect to the received data or for other reasons.

Another object of the present invention is to provide a communication terminal device whose power consumption is appropriately reduced without degrading users' ease of use even in such a case of a WAP system in which communication is conducted on the basis of a plurality of display screens.

According to the first aspect of the invention, a communication terminal device comprises display means for displaying information such as characters, input means for receiving input of operation information, processing means for generating the information based on operation information of the input means, and light-emitting means for lighting at least either the display means or the input means, reception means for receiving contents data described in a predetermined information description language based on the operation information, code detection means for detecting a predetermined code indicative of the end of contents data received by the reception means, and light-emission control means for stopping light-emission by the light-emitting means upon start of the reception of the contents data by the reception means and starting light-emission by the light-emitting means upon detection of the predetermined code by the code detection means.

More specifically, the present invention controls stop and start of light-emission of a light-emitting unit which lights at least one of a display unit for displaying information such as characters and an input unit through which operation information is applied. A light-emission control unit provides control such that light-emission is stopped upon start of reception of contents data by a reception unit and when a predetermined code indicative of the end of the contents data is detected by a code detection unit from the contents data described in a predetermined information description language and received by the reception unit, light-emission is started.

In the preferred construction, the communication terminal device comprises communication type determination means for determining whether call is to be made by voice information or the contents data is to be received, and light-emission control means for, when the determination is made by the communication type determination means that the call is to be made, stopping light-emission by the light-emitting means upon start of the call and starting light-emission by the light-emitting means upon end of the call and when the determination is made by the communication type determination means that the contents data is to be received, stopping light-emission by the light-emitting means upon start of the reception of the contents data by the reception means and starting light-emission by the light-emitting means upon detection of the predetermined code by the code detection means.

More specifically, according to the present invention, a communication type determination unit is provided for determining whether to make a call using voice information or to receive contents data. Then, when the determination is made by the communication type determination unit that a call is to be made, the light-emission control unit stops light-emission of the light-emitting unit upon start of the call and starts light-emission of the light-emitting unit upon completion of the call, and when the determination is made by the communication type determination unit that the contents data is to be received, stops light-emission of the light-emitting unit upon start of reception of the contents data by the reception unit and starts light-emission of the light-emitting unit when a predetermined code is detected by the code detection unit.

In another preferred construction, the communication terminal device comprises time counting means for starting counting time from when the operation information is input by the input means, and light-emission stop means for stopping light-emission by the light-emitting means when time counted by the time counting means overs a lighting time set in advance.

In another preferred construction, the communication terminal device comprises communication type determination means for determining whether call is to be made by voice information or the contents data is to be received, light-emission control means for, when the determination is made by the communication type determination means that the call is to be made, stopping light-emission by the light-emitting means upon start of the call and starting light-emission by the light-emitting means upon end of the call and when the determination is made by the communication type determination means that the contents data is to be received, stopping light-emission by the light-emitting means upon start of the reception of the contents data by the reception means and starting light-emission by the light-emitting means upon detection of the predetermined code by the code detection means, time counting means for starting counting time from when the operation information is input by the input means, and light-emission stop means for stopping light-emission by the light-emitting means when time counted by the time counting means overs a lighting time set in advance.

In another preferred construction, the reception means receives contents data described in an information description language such as a hypertext markup language or a wireless markup language, and the code detection means detects a predetermined end tag indicative of the end of contents data received by the reception means.

More specifically, according to the present invention, contents data received by the reception unit is described in an information description language such as a hypertext markup language or a wireless markup language and the code detection unit detects a predetermined end tag indicative of the end of the contents data.

In another preferred construction, the reception means receives contents data described in an information description language such as a hypertext markup language or a wireless markup language, and the code detection means detects a predetermined end tag indicative of the end of contents data received by the reception means, and the communication terminal device further comprises time counting means for starting counting time from when the operation information is input by the input means, and light-emission stop means for stopping light-emission by the light-emitting means when time counted by the time counting means overs a lighting time set in advance.

In another preferred construction, the communication terminal device comprises communication type determination means for determining whether call is to be made by voice information or the contents data is to be received, and light-emission control means for, when the determination is made by the communication type determination means that the call is to be made, stopping light-emission by the light-emitting means upon start of the call and starting light-emission by the light-emitting means upon end of the call and when the determination is made by the communication type determination means that the contents data is to be received, stopping light-emission by the light-emitting means upon start of the reception of the contents data by the reception means and starting light-emission by the light-emitting means upon detection of the predetermined code by the code detection means, wherein
   the reception means receives contents data described in an information description language such as a hypertext markup language or a wireless markup language, and the code detection means detects a predetermined end tag indicative of the end of contents data received by the reception means.

In another preferred construction, the communication terminal device comprises communication type determination means for determining whether call is to be made by voice information or the contents data is to be received, light-emission control means for, when the determination is made by the communication type determination means that the call is to be made, stopping light-emission by the light-emitting means upon start of the call and starting light-emission by the light-emitting means upon end of the call and when the determination is made by the communication type determination means that the contents data is to be received, stopping light-emission by the light-emitting means upon start of the reception of the contents data by the reception means and starting light-emission by the light-emitting means upon detection of the predetermined code by the code detection means, time counting means for starting counting time from when the operation information is input by the input means, and light-emission stop means for stopping light-emission by the light-emitting means when time counted by the time counting means overs a lighting time set in advance, wherein
   the reception means receives contents data described in an information description language such as a hypertext markup language or a wireless markup language, and the code detection means detects a predetermined end tag indicative of the end of contents data received by the reception means.

In another preferred construction, the light-emission control means, at the time of stopping light-emission by the light-emitting means, stops light-emission after a lapse of a predetermined wait time.

According to the second aspect of the invention, a communication terminal device comprises
   display means for displaying information such as characters,
   input means for receiving input of operation information,
   processing means for generating the information based on operation information of the input means, and
   light-emitting means for lighting at least either the display means or the input means,
   reception means for receiving contents data described in a predetermined information description language expressing one contents data by a plurality of cards based on the operation information,
   code detection means for detecting a card end tag indicative of the end of each the card of the contents data received by the reception means, and light-emission control means for stopping light-emission by the light-emitting means upon start of the reception of the contents data by the reception means and starting light-emission by the light-emitting means upon detection of the card end tag by the code detection means.

More specifically, the present invention controls stop and start of light-emission of the light-emitting unit which lights at least one of the display unit for displaying information such as characters and the input unit through which operation information is applied. The light-emission control unit provides control such that light-emission is stopped upon start of reception, by the reception unit, of contents data described in a predetermined information description language expressing one contents data by a plurality of cards and light-emission is started upon detection, by the code detection unit, of a card end tag indicative of the end of each card of the contents data from the contents data described in a predetermined information description language and received by the reception unit.

In the preferred construction, the reception means receives contents data described in a wireless markup language.

In other words, according to the present invention, light-emission of the light-emitting unit is started after receiving contents data described in a wireless markup language and detecting a card end tag indicative of the end of each card. This arrangement prevents the communication terminal device applied to the WAP system from wastefully consuming electric current required for the light-emitting unit to emit light during a time from the end of the reception of the contents data until the end of browsing.

In another preferred construction, the communication terminal device further comprises detection tag setting means for in advance setting either an end tag indicative of the end of the contents or a card end tag indicative of the end of each the card to be detected, wherein the code detection means detects a tag set by the detection tag setting means from the contents data received by the reception means, and the light-emission control means stops light-emission by the light-emitting means upon start of the reception of the contents data by the reception means and starts light-emission by the light-emitting means upon detection of a tag set by the detection tag setting means by means of the code detection means.

More specifically, the present invention is provided with a detection tag setting unit to enable either conducting detection of an end tag indicative of the end of contents or conducting detection of a card end tag indicative of the end of each card to be set in advance. Then, the code detection unit detects a tag set by the detection tag setting unit from the received contents data and the light-emission control unit controls such that upon start of the reception of the contents data, light-emission by the light-emitting means is stopped and when the tag set by the detection tag setting unit is detected by the code detection unit, light-emission by the light-emitting means is started. As a result, optimum light-emission control better meeting conditions of use by a user can be realized.

In another preferred construction, the reception means receives contents data described in a wireless markup language, and which further comprises detection tag setting means for in advance setting either an end tag indicative of the end of the contents or a card end tag indicative of the end of each the card to be detected, and wherein the code detection means detects a tag set by the detection tag setting means from the contents data received by the reception means, and the light-emission control means stops light-emission by the light-emitting means upon start of the reception of the contents data by the reception means and starts light-emission by the light-emitting means upon detection of a tag set by the detection tag setting means by means of the code detection means.

In another preferred construction, the communication terminal device comprises time counting means for starting counting time from when the operation information is input by the input means, and light-emission stop means for stopping light-emission by the light-emitting means when time counted by the time counting means overs a lighting time set in advance.

More specifically, the present invention is provided with a counting unit to enable light-emission of the light-emitting means to be stopped after a lapse of a lighting time set in advance since the application of operation information, so that wasteful consumption of electric current can be reduced after a lapse of time when it is highly probable that a user will not watch the display unit.

In another preferred construction, the communication terminal device comprises time counting means for starting counting time from when the operation information is input by the input means, and light-emission stop means for stopping light-emission by the light-emitting means when time counted by the time counting means overs a lighting time set in advance, wherein the reception means receives contents data described in a wireless markup language.

In another preferred construction, the communication terminal device comprises time counting means for starting counting time from when the operation information is input by the input means, light-emission stop means for stopping light-emission by the light-emitting means when time counted by the time counting means overs a lighting time set in advance, and detection tag setting means for in advance setting either an end tag indicative of the end of the contents or a card end tag indicative of the end of each the card to be detected, wherein the code detection means detects a tag set by the detection tag setting means from the contents data received by the reception means, and the light-emission control means stops light-emission by the light-emitting means upon start of the reception of the contents data by the reception means and starts light-emission by the light-emitting means upon detection of a tag set by the detection tag setting means by means of the code detection means.

In another preferred construction, the light-emission control means, at the time of stopping light-emission by the light-emitting means, stops light-emission after a lapse of a predetermined wait time.

More specifically, since according to the present invention, light-emission by the light-emitting unit is stopped after a lapse of a predetermined wait time, user is allowed to confirm by visual observation that data communication is started only by watching the display unit for a fixed time period after the reception of the data communication is started, resulting in further improving user's ease of use.

According to the third aspect of the invention, a display control method in a communication terminal device having display means for displaying information such as characters, input means for receiving input of operation information, processing means for generating the information based on operation information of the input means, and light-emitting means for lighting at least either the display means or the input means, comprising the steps of receiving contents data described in a predetermined information description language based on the operation information, detecting a predetermined code indicative of the end of received contents data, and stopping light-emission by the light-emitting means upon start of the reception of the contents data and starting light-emission by the light-emitting means upon detection of the predetermined code.

In the preferred construction, the display control method in a communication terminal device comprising the steps of determining whether call is to be made by voice information or the contents data is to be received, and when the determination is made that the call is to be made, stopping light-emission by the light-emitting means upon start of the call and starting light-emission by the light-emitting means upon end of the call and when the determination is made that the contents data is to be received, stopping light-emission by the light-emitting means upon start of the reception of the contents data and starting light-emission by the light-emitting means upon detection of the predetermined code.

In another preferred construction, the display control method in a communication terminal device comprising the steps of counting the time from when the operation information is input by the input means, and stopping light-emission by the light-emitting means when counted time overs a lighting time set in advance.

According to another aspect of the invention, a display control method in a communication terminal device having display means for displaying information such as characters, input means for receiving input of operation information, processing means for generating the information based on operation information of the input means, and light-emitting means for lighting at least either the display means or the input means, comprising the steps of receiving contents data described in a predetermined information description language expressing one contents data by a plurality of cards based on the operation information, detecting a card end tag indicative of the end of each the card of received contents data, and stopping light-emission by the light-emitting means upon start of the reception of the contents data and starting light-emission by the light-emitting means upon detection of the card end tag.

In the preferred construction, the display control method in a communication terminal device, contents data described in a wireless markup language is received.

In another preferred construction, the display control method in a communication terminal device further comprising the steps of in advance setting either an end tag indicative of the end of the contents or a card end tag indicative of the end of each the card to be detected, detecting a set tag from received contents data, and stopping light-emission by the light-emitting means upon start of the reception of the contents data and starting light-emission by the light-emitting means upon detection of a set tag.

In another preferred construction, the display control method in a communication terminal device further comprising the steps of counting time from when the operation information is input by the input means, and stopping light-emission by the light-emitting means when counted time overs a lighting time set in advance.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 5 is an explanatory diagram showing one example of contents data described in HTML according to the first embodiment;

FIG. 6 is an explanatory diagram showing a screen image of an LCD of the communication terminal device according to the first embodiment;

FIG. 8 is an explanatory diagram showing one example of contents data described in WML according to a second embodiment of the present invention;

FIG. 9 is a timing chart showing lighting timing in the second embodiment;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First Embodiment

Figure 1:
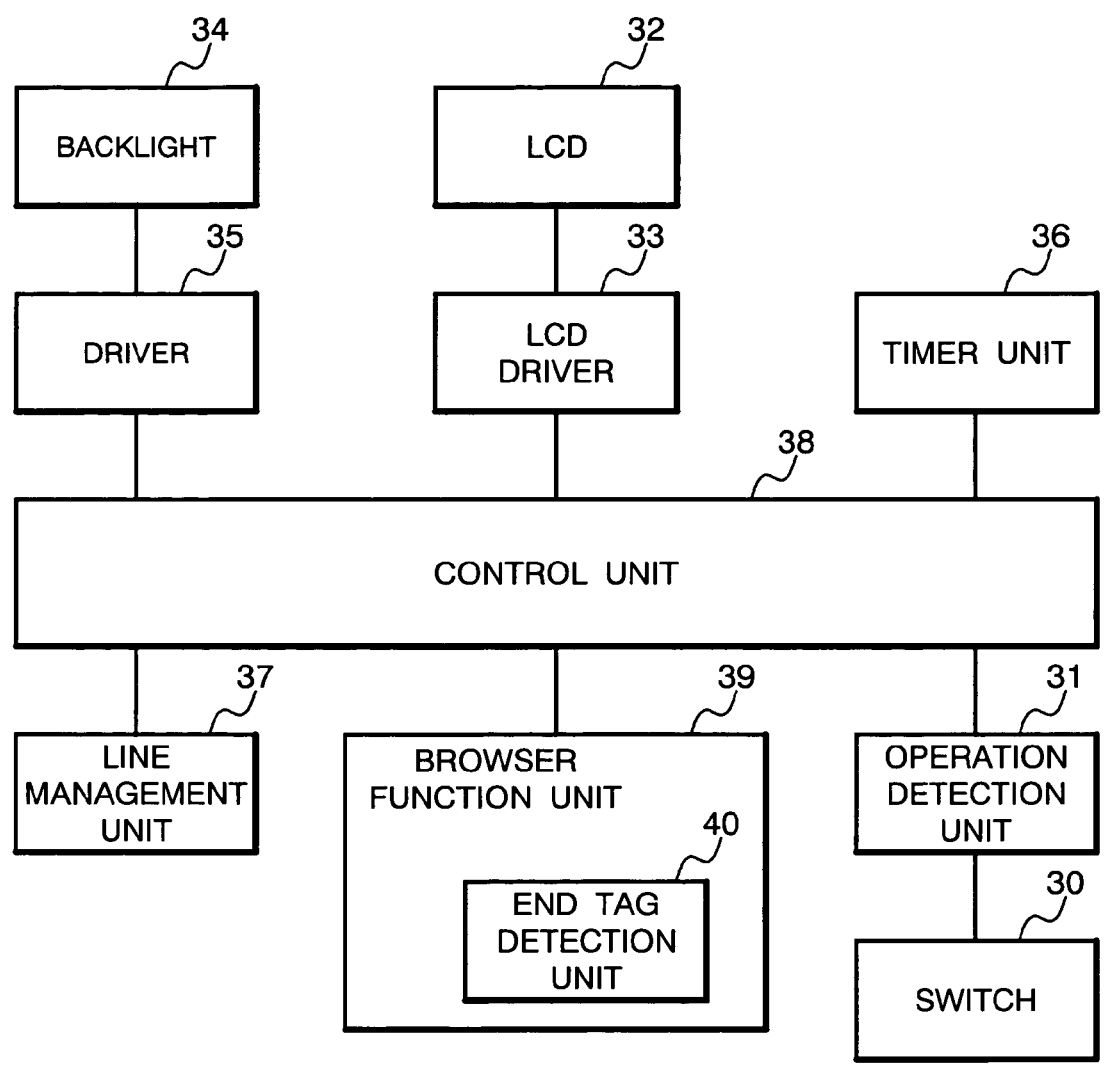
FIG. 1 is a block diagram showing an outline of a structure of a communication terminal device according to a first embodiment.

FIG. 1 shows an outline of a structure of a communication terminal device according to a first embodiment of the present invention. The communication terminal device according to the first embodiment is structured to conduct voice transmission and reception and data communication such as contents data acquisition from a server on the Internet through a radio communication line connected to a third party by means of a network not shown. The communication terminal device includes an SW30 for receiving input of various kinds of instructions to the device as operation information, an operation detection unit 31 for detecting operation by the SW30, an LCD 32 for displaying information such as characters, an LCD driver 33 for driving the LCD 32 according to instructed display information, a backlight 34 for lighting the LCD 32, a driver 35 for driving the backlight 34, a timer unit 36 for counting a lighting time of the backlight 34, a line management unit 37 for conducting connection management of a radio communication line between the device and a third party through a network not shown, and a control unit 38 in charge of control of each unit of the communication terminal device. While in the following, description will be made of control of the backlight which lights the LCD 32, no description will be made of a backlight which lights the SW30 because it can be similarly controlled.

The SW30 is composed of a plurality of keys through which operation information for a user to make a call and to access contents data is entered. The operation detection unit 31 detects pressing and releasing of various keys of the SW30 conducted by a user to generate operation information corresponding to contents of user's operation. The LCD driver 33 sends out a control signal to the LCD 32 according to display information instructed by the control unit 38 to display the instructed contents. The backlight 34, which is composed of a plurality of light-emitting devices, lights the LCD 32 from the back. Although the following description will be made of the backlight, the same is the case with a sidelight which lights the LCD or the like from the side. The driver 35 amplifies a backlight turn-on and turn-off instruction signals instructed by the control unit 38 and sends a control signal corresponding to the amplified signal to the backlight 34. The timer unit 36 starts counting time according to a counting start instruction by the control unit 38 to notify the control unit 38 of a lapse of a predetermined time-out time set in advance as time out.

The line management unit 37 conducts connection management of a radio communication line with a third party not shown by the GSM (Global System for Mobile Communication) system using time division multiple access (hereinafter referred to as TDMA) communication which is standardized by European Telecommunications Standard Institute (ETSI).

The communication terminal device according to the first embodiment conducts backlight control according to a communication state detected by the line management unit 37. Therefore, description will be first made of connection management of radio communication lines executed by the line management unit 37.

Figure 2:
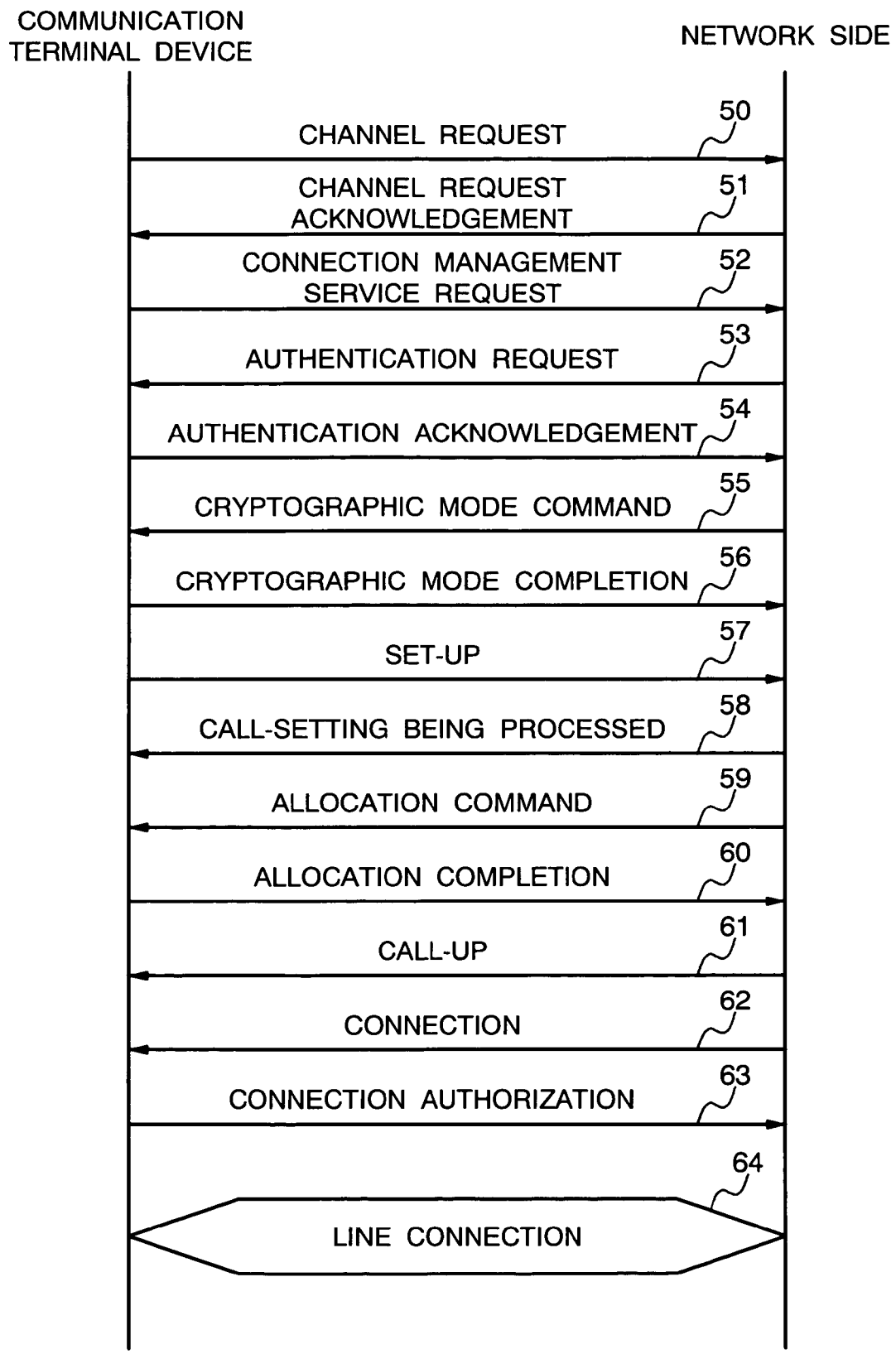
FIG. 2 is a sequence diagram showing an outline of an outgoing call sequence of the communication terminal device according to the first embodiment.

FIG. 2 shows an outline of a sequence of an outgoing call executed by the line management unit 37 in the first embodiment. At the time of making a call by the communication terminal device, the line management unit 37 first transmits a channel request 50 to a switching system on the network side not shown to make a request for connection for a call which requests a usable channel. Upon responsively receiving a channel request acknowledgement 51 from the network side, send a connection management service request 52 for notifying a type of communication services which indicates ordinary voice transmission and reception or data communication. Upon receiving an authentication request 53 from the network side for confirming that the request for connection for a call is from a contracted communication terminal device, transmit a predetermined authentication acknowledgement 54 in response to the request.

Upon authentication on the network side, receive a cryptographic mode command 55 designating which cryptographic code is to be used from the network side and return a cryptographic mode completion 56 indicating that setting of the cryptographic mode is completed. Thereafter, when a preparation for call setting is completed in the communication terminal device, send a set-up 57 to the network side and when receiving a call setting being processed 58 in response thereto, set allocation based on an allocation command 59 which is subsequently received for allocating a time slot etc. that the own device will use in the TDMA communication and send the notification of completion of setting as an allocation completion 60 to the network side. Then, upon reception of a call-up 61 from the network side, respond to a connection 62 from the network side by a connection authorization 63 to complete a line connection 64.

Figure 3:
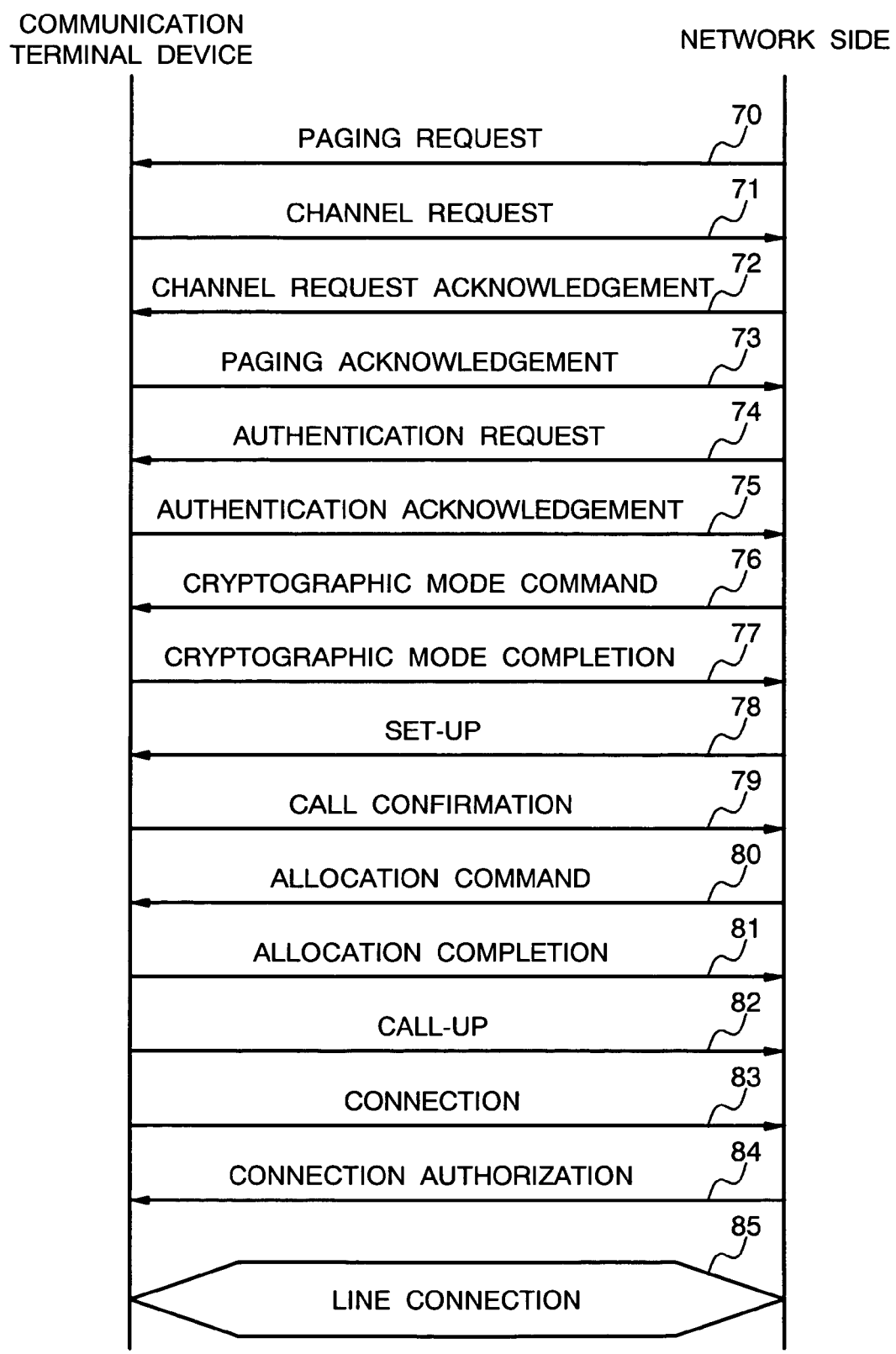
FIG. 3 is a sequence diagram showing an outline of an incoming call sequence of the communication terminal device according to the first embodiment.

FIG. 3 shows an outline of an incoming call sequence executed by the line management unit 37 in the first embodiment. When an incoming call to the communication terminal device is generated, first, from the network side not shown, a paging request 70 is sent to the communication terminal device. From the paging request 70, the line management unit 37 determines a type of communication services which indicates that the request is for ordinary voice transmission and reception or data communication. Thereafter, the line management unit 37 sends a channel request 71 to a switching system not shown on the network side to make a request for a connection for calling which requests a usable channel. When responsively receiving a channel request acknowledgement 72 from the network side, return a paging acknowledgement 73. Subsequently, upon receiving, from the network side, an authentication request 74 for confirming that the request for connection for a call is from a contracted communication terminal device, responsively transmit a predetermined authentication acknowledgement 75.

Upon authentication on the network side, receive a cryptographic mode command 76 designating which cryptographic code is to be used from the network side and return a cryptographic mode completion 77 indicating that setting of the cryptographic mode is completed. Then, when a preparation for setting a call from the network side to the communication terminal device is completed, receive a set-up 78 from the network side and when call setting for an incoming call is completed in the communication terminal device, return a call confirmation 79. Subsequently, set allocation based on an allocation command 80 which is subsequently received from the network side for allocating a time slot etc. that the own device will use in the TDMA communication and send the notification of completion of the setting as an allocation completion 81 to the network side. Then, send a call-up 82 to the network side, and subsequently upon reception of a connection authorization 84 in response to a connection 83 with the network side, line connection 85 is completed.

The communication terminal device according to the first embodiment is provided with a browsing function unit 39 for receiving contents described in a predetermined information description language such as HTML or WML by data communication through a network and reading the same. The information description language is structured to designate character decoration and layout according to a reserved word code sandwiched between symbols "<" and ">" called tag in the text file format. Such various designations are made between a tag sandwiched between "<" and ">" and a tag having the same reserved word code as that of the former tag sandwiched between "</" and ">". Furthermore, this information description language is characterized in that specific display data can be linked to other contents data. This enables a large volume of data at a link destination to be taken in only when necessary as long as the displayed contents data itself has only a description for displaying. The browser function unit 39 includes an end tag detection unit 40 for searching received contents data to detect a predetermined end tag defined by the information description language.

Thus structured communication terminal device, when the line management unit 37 for conducting line connection management by the sequence operation shown in FIGS. 2 and 3 determines whether communication is classified as data communication or voice transmission and make a determination that it is data communication, turns off the backlight upon start of the data communication, and at the reception of the data communication, when a predetermined end tag is detected from the received contents by the end tag detection unit 40, turns on the backlight 34.

The control unit 38 of thus structured communication terminal device has a CPU not shown to execute the above-described lighting control of the backlight 34 based on a control program stored in a predetermined storage device such as a ROM.

Figure 4:
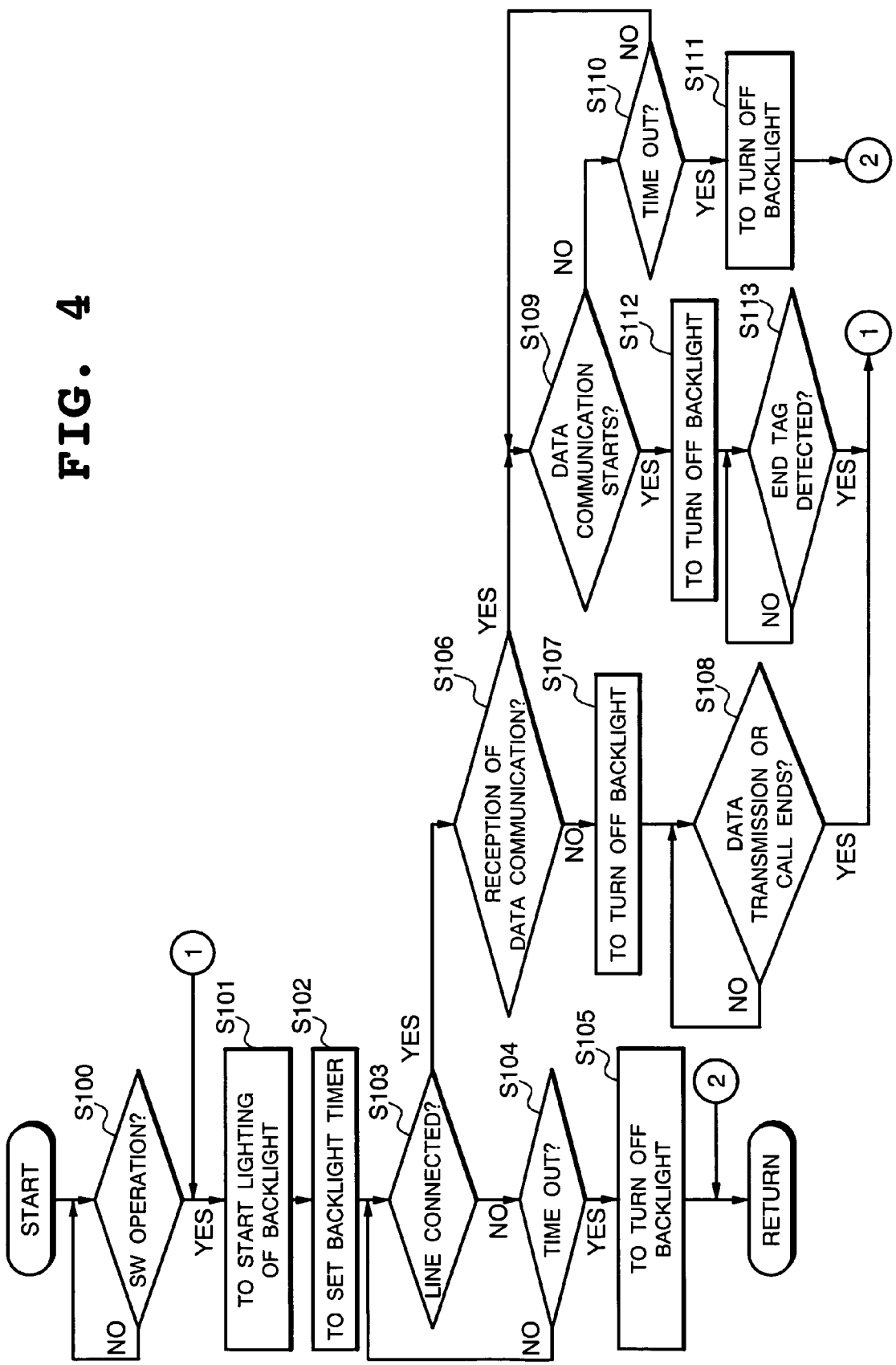
FIG. 4 is a flow chart showing an outline of processing contents of backlight lighting control of the communication terminal device according to the first embodiment.

FIG. 4 shows an outline of processing contents of the backlight lighting control program stored in a predetermined storage device of the control unit 38. First, the control unit 38 monitors whether operation by the SW30 is conducted by means of the operation detection unit 31 (Step S100: N) and when operation is detected (Step S100: Y), starts, by means of the driver 35, lighting of the backlight 34 for lighting the LCD 32 on which information such as characters is already displayed through the LCD driver 33 according to predetermined display information (Step S101). Furthermore, set a predetermined lighting time of the backlight 34 at the timer unit 36 as a backlight timer value (Step S102) to start counting a lightning time of the backlight 34. Through these steps, after a lapse of a time corresponding to the backlight timer value set at Step S102, time out is notified by the timer unit 36.

Subsequently, the line management unit 37 monitors whether a connection of a radio communication line is established with a third party not shown in response, for example, to the channel request shown in FIG. 2 at the time of transmission and for example, to the paging request shown in FIG. 3 at the time of reception (Step S103) and when detecting no connection (Step S103: N), determines whether time out indicating that a time of the backlight timer value set at Step 102 has elapsed is detected or not from the timer unit 36 (Step S104). When no determination is made that time out is detected from the timer unit 36 (Step S104: N), return to Step S103 to again monitor existence/non-existence of a line connection. On the other hand, when the determination is made at Step S104 that time out is detected from the timer unit 36 (Step S104: Y), turn off the backlight 34 through the driver 35 (Step S105) and return to Step S100 to again monitor whether operation by the SW30 is conducted or not by means of the operation detection unit 31 (return).

When at Step S103, the line management unit 37 detects a connection of a radio communication line being established with the third party not shown in response to, for example, the channel request shown in FIG. 2 at the time of transmission and for example, the paging request shown in FIG. 3 at the time of reception (Step S103: Y), the control unit 38 controls the line management unit 37 to determine on a communication type similarly in response to, for example, to the connection management service request shown in FIG. 2 at the time of transmission and for example, to the paging request shown in FIG. 3 at the time of reception (Step S106). When at Step S106 the determination is made that ordinary voice transmission and reception or transmission of data communication other than reception of data communication is to be conducted (Step S106: N), immediately turn off the backlight 34 through the driver 35 (Step S107). Subsequently, monitor the end of the transmission in the data communication or the end of voice transmission and reception (Step S108: N) and when detecting the same (Step S108: Y), return to Step S101 to again start lighting of the backlight 34. As a result, at the time of ordinary voice transmission and reception and transmission of data communication, the backlight is turned off from the start to the end of the communication function.

When at Step S016 the determination is made that reception of the data communication is to be conducted (Step S106: Y), monitor by means of the line management unit 37 whether reception of the data communication is started or not in response, for example, to the paging request or the connection authorization etc. shown in FIG. 3 (Step S109). When not detecting the start of the reception of the data communication (Step S109: N), determine whether time out indicating that a time of the backlight timer value set at Step S102 has elapsed is detected from the timer unit 36 (Step S110). When no determination is made that time out is detected from the timer unit 36 (Step S110: N), return to Step S109 to again determine whether the reception of the data communication is started or not. On the other hand, when the determination is made at Step S110 that time out is detected from the timer unit 36 (Step S110: Y), turn off the backlight 34 through the driver 35 (Step S111) and return to Step S100 to again monitor whether operation by the SW30 is conducted by means of the operation detection unit 31 (return).

On the other hand, when the determination is made at Step S109 that the reception of the data communication has started (Step S109: Y), turn off the backlight 34 through the driver 35 (Step S112). In the reception of the data communicate conducted by the line management unit 37, when the received data is the contents data described in the above-described predetermined information description language, the data is once binarized to have the volume of communication data compressed by the third party not shown as the data transmission destination and sent. The line management unit 37 whenever occasion demands converts the received contents data into contents data in a text format such as HTML or WML as display information to the LCD 32. Accordingly, after the backlight 34 is turned off upon start of the reception of the data communication at Step S112, the browser function unit 39 generates display information by predetermined data conversion processing in order to read the received data, while the end tag detection unit 40 detects a predetermined end tag defined by HTML or WML (Step S113: N). Then, when the end tag is detected by the end tag detection unit 40 (Step S113: Y), return to Step S101 to start lighting of the backlight 34.

Thus, the control unit 38 turns on the backlight upon SW operation and when no line connection is established, turns off the backlight immediately after a lapse of a predetermined backlight lighting time. When the line is connected to conduct ordinary voice transmission and reception or transmission of the data communication, the unit 38 turns off the backlight and starts lighting of the backlight again upon completion of the voice transmission and reception or completion of the transmission of the data communication. While when the line is connected to conduct reception of the data communication, the unit 38 turns off the backlight after a lapse of the predetermined backlight lighting time to again monitor SW operation, when the reception of the data communication is started before the lapse of the time, immediately turns off the backlight 34 to start lighting of the backlight upon completion of the reception of the data communication.

Next, description will be made of specific operation conducted when the communication terminal device receives contents data according to the first embodiment.

FIG. 5 shows one example of contents data described in HTML which is received by the communication terminal device according to the first embodiment. More specifically, the contents data has its contents defined between "<HTML>" as a start tag and "</HTML>" as an end tag. Then, a character string "processional baseball news" designated between "<HEAD>" and "</HEAD>" and between "<TITLE>" and "</TITLE>" is displayed as a title. Furthermore, with specific contents within a range sandwiched between "<body>" and "</body>", in which a range between a line feed tag "<br>" and a form feed tag "<p>" and a range from "<font face=" to "</font>" in a font designated by "<font face=" are displayed, display layout on the LCD of the communication terminal device is made by appropriately inserting a "blank" of one character by " ".

FIG. 6 shows one example of a screen image of the LCD of the communication terminal device according to the first embodiment. In the figure, (a) shows an image of a screen on the LCD 32 obtained at the time of operation for starting data communication. (b) in the figure shows a screen image on the LCD 32 obtained when the contents data is being received. (c) in the figure shows a screen image of the received contents data on the LCD 32. When accessing the Internet to obtain the contents data, the user makes the LCD 32 display menu data mounted in advance in the communication terminal device of the first embodiment as illustrated in (a) by means of the browser function 39 and selects a desired item from the displayed menu by means of the SW 30. Here, assume that the user selects "sports".

The menu data shown in (a) of FIG. 6 is also described in the above-described HTML and each selection item is linked to the contents data stored in the server on the Internet not shown. Accordingly, when "sports" is selected, reception of the data communication will be started by the server on the Internet linked to "sports" through the line management unit 37 following the sequence shown in FIG. 3. Here, as shown in FIG. 4, while the backlight 34 is turned on by the operation of the SW 30 within the predetermined backlight lighting time, the backlight 34 is turned off upon start of the reception of the data communication.

During the reception of the contents data, as much data as received on occasion demands is converted into display information of the text format described in HTML shown in FIG. 5 and displayed on the LCD 32 through the LCD driver 33 as shown in FIG. 6(*b*). During the time, the backlight 34 remains off. Here, when the reception of the contents data ends and the data is converted into display information of the text format described in HTML to detect the predetermined end tag "</HTML>", the information is displayed on the LCD 32 as illustrated in (c) of the figure, while the backlight 34 is turned on.

Figure 7:
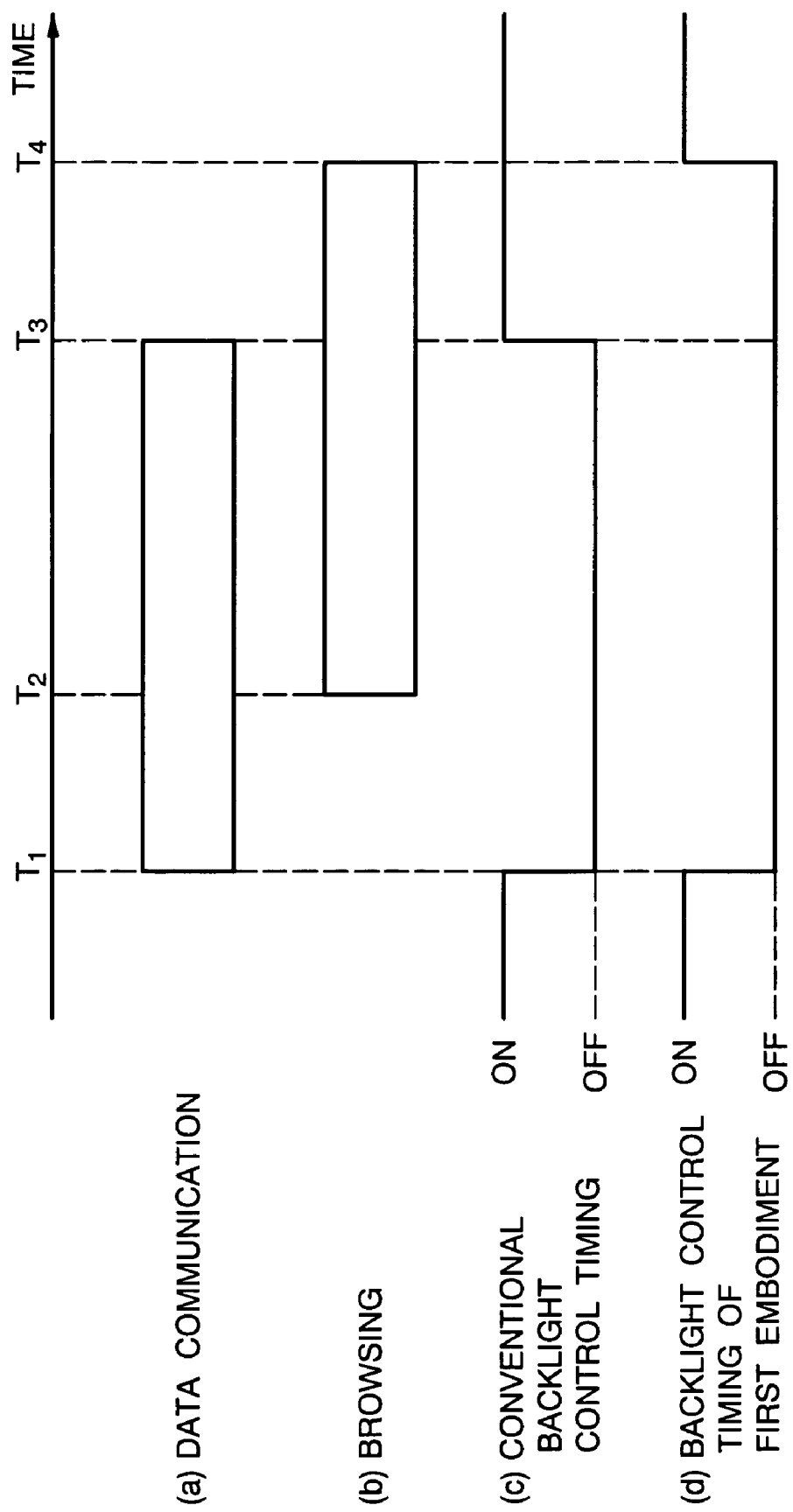
FIG. 7 is a timing chart showing lighting timing in the first embodiment.

FIG. 7 shows lighting timing of the backlight. (a) of the figure shows timing of data communication time. (b) of the figure shows timing of browsing which is the data processing for converting received contents data into display information of the text format. (c) of the figure shows conventional backlight control timing. (d) of the figure shows backlight control timing in the first embodiment. More specifically, when the contents data is downloaded from time $T_1$ to $T_2$ as shown in (a) of the figure, the browser function unit 39 starts converting the contents data received into display information of the text format described in HTML at time $T_2$ a little later than time $T_1$. The data conversion processing is completed at time $T_4$ a little later than time $T_3$ when the downloading ends.

As is already described, the conventional communication terminal device turns off the backlight at time $T_1$ when the data communication starts and turns on the backlight at time $T_3$ when the data communication ends. On the other hand, the communication terminal device according to the first embodiment turns off the backlight similarly at time $T_1$ when the data communication starts but does not turn on the backlight at time $T_3$ when the data communication ends, and turns on the backlight at time $T_4$ when after the data communication is finished, browsing for converting the received contents data into display information of the text format described in HTML ends and the end tag is detected.

In other words, from $T_3$ to $T_4$, that is, during a time when the reception of the data communication ends but browsing is yet to end, useless light of the backlight is refrained to prevent wasteful consumption of electric current.

Thus, the communication terminal device according to the first embodiment is structured such that the line management unit 37 detects whether radio communication is classified into transmission or reception of data communication, or voice transmission and reception, while the browsing function unit 39 for browsing contents data described in a predetermined information description language causes the end tag detection unit 40 to detect an end tag indicative of the end of the contents data defined by the information description language. Then, the backlight is turned on upon SW operation and when no line connection is made by the line management unit 37, the backlight is immediately turned off after a lapse of a predetermined backlight lighting time. When a line connection is established by the line management unit 37 to conduct ordinary voice transmission and reception or transmission of data communication, the backlight is turned off and upon the end of voice transmission and reception or the end of transmission of the data communication, lighting of the backlight is again started.

When a line connection is established to conduct reception of the data communication, the backlight is turned off after a lapse of a predetermined lighting time to again monitor SW operation, while when the reception of the data communication has started before then, the backlight 34 is immediately turned off and lighting of the backlight is again started upon completion of the reception of the data communication. As a result, after the end of reception of data communication, useless electric current conventionally wasted by lighting of the backlight before the end of the browsing processing can be eliminated to enable reduction in power consumption of a communication terminal device whose representative is a WAP system and which is more and more frequently used for data communication such as reception of contents data.

Second Embodiment

While the communication terminal device according to the first embodiment is structured such that the backlight is turned on upon detection of an end tag indicative of the end of contents data, in a case where contents data is described in WML which is applied in a WAP system, the backlight may be turned on upon detection of "</card>" as an end tag of "CARD" which is a smaller contents unit. WML is based on a small contents unit called "CARD", in which transmission and reception is conducted on a basis of a "DECK" composed of a plurality of "CARD". Accordingly, when an end tag is detected on a "DECK" basis, such a situation can be avoided that even when display information corresponding to the first screen "CARD" is completed, displaying thereof should be refrained until reception of all the "DECK" ends. It is also possible to allow each user to select either "</wml>" which is an end tag of each "DECK" or an end tag "</card>" of each "CARD" as an end tag to be detected for turning on the backlight.

Since the communication terminal device according to the second embodiment is the same in structure and operation as the communication terminal device according to the first embodiment, no illustration and description thereof will be made. The communication terminal device according to the second embodiment differs in that the backlight is turned on by the detection of "</card>" as an end tag.

FIG. 8 shows one example of contents data described in WML which is received by the communication terminal device according to the second embodiment. More specifically, the contents data has its contents defined between "<wml>" as a start tag and "</wml>" as an end tag. Then, a range sandwiched between "<card>" and "</card>" is set to be one "CARD". Then, a part of each "CARD" sandwiched between a page start tag "<p>" and a page end tag "</p>" is designated as one page. One "CARD" is equivalent to one screen of the LCD Here, when "CARD" of the first screen is received, it is displayed on the LCD as it is because of "<do type= . . . ", while when a predetermined position on the display screen is selected by SW, display of the "CARD" indicated by "<go href=" is made. For example, while the "CARD" starting with [ⒸGIANTS VS. TIGERS] is being displayed, when a predetermined position on the screen is selected by SW, displayed is "CARD2" which is the "CARD" starting with [GIANTS VS. TIGERS 6–4, OWING TO PITCHING AND HITTING LEADING ROLES, GIANTS WON . . . ]

FIG. 9 shows lighting timing of the backlight according to the second embodiment. (a) of the figure shows timing of data communication time. (b) of the figure shows timing of browsing which is data processing for converting received contents data into display information of the text format by means of the browsing function unit. (c) of the figure shows conventional backlight control timing. (d) of the figure shows backlight control timing in the second embodiment. More specifically, when the contents data described in WML is downloaded from time $T_{10}$ to $T_{11}$ as shown in (a) of the figure, the browsing function unit starts converting the received contents data into display information of the text format described in WML at time $T_{12}$ a little later than time $T_{11}$. The data conversion processing is completed at time $T_{13}$ a little later than time $T_{11}$ when the downloading ends.

As described in the foregoing, the conventional communication terminal device turns off the backlight at time $T_{10}$ when the data communication is started and turns on the backlight at time $T_{11}$ when the data communication ends. On the other hand, the communication terminal device according to the second embodiment similarly turns off the backlight at time $T_{10}$ when the data communication starts but turns on the backlight once in response to the end tag "</card>." More specifically, the device once turns on the backlight at time $T_{14}$ when the browsing of "CARD1" ends and the end tag detection unit detects the end tag "</card>" to display the contents of "CARD1" on the LCD.

Since "CARD1" is once displayed and a user is allowed to scroll the display screen of the "CARD1" by user's SW operation, even at a time point where the contents data of "CARD2" and "CARD3" is received and browsing of each "CARD" is finished, the backlight remains on. On the other hand, assuming that at the reception of the contents data "CARD1" to "CARD3" set at the timer unit, backlight time-out values at $\Delta t_1$, $\Delta t_2$ and $\Delta t_3$, after the browsing of "CARD1" ends at time $T_{14}$ and its contents are displayed on the LCD, if no SW operation is made, the backlight is turned off at time "$T_{14}+\Delta t_1$" (broken line 130). Here, if the time "$T_{14}+\Delta t_1$" is later than time $T_{15}$, the backlight will not be turned off.

When the time "$T_{14}+\Delta t_1$" is earlier than time $T_{15}$, the backlight is again turned on at time $T_{15}$ when browsing of the next "CARD2" is finished to detect the end tag "</card>". When no SW operation is made after the browsing of "CARD2" is finished and its contents is displayed on the LCD similarly at time $T_{15}$, the backlight is turned off at the time "$T_{15}+\Delta t_2$" (broken line 131). Here, when the time "$T_{15}+\Delta t_2$" is later than time $T_{13}$, the backlight will not be turned off.

When the time "$T_{15}+\Delta t_2$" is earlier than time $T_{13}$, the backlight is turned on again at time $T_{13}$ when browsing of the next "CARD3" ends to detect the end tag "</card>". Thereafter, when no SW operation is made, the backlight is turned off at time $T_{16}$ equivalent to time "$T_{13}+\Delta t_3$".

Figure 10:
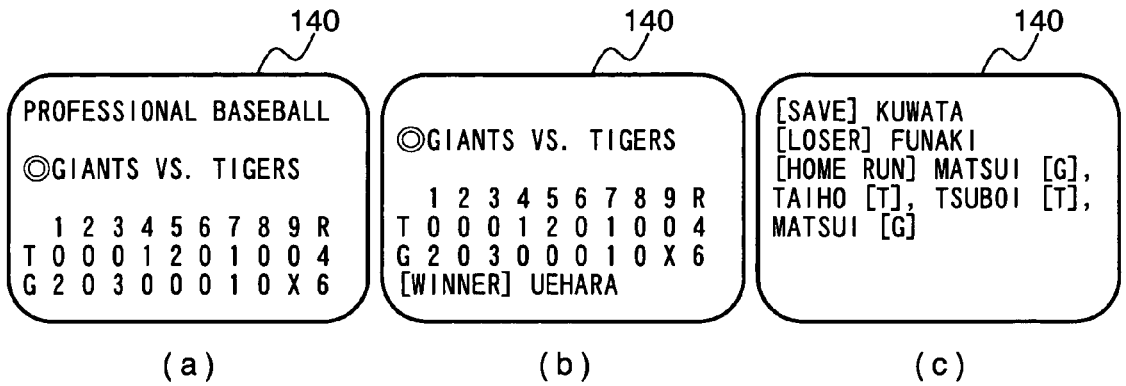
FIG. 10 is an explanatory diagram showing one example of a screen image of "CARD1" in the second embodiment.

FIG. 10 shows one example of a screen image of "CARD1" on the LCD of the communication terminal device according to the second embodiment. (a) of the figure shows a screen image of "CARD1". (b) of the figure shows a screen image obtained by scrolling "CARD1" by one line. (c) of the figure shows a screen image obtained by scrolling "CARD1" up to the final line. As shown in FIG. 9, when at time $T_{14}$, browsing of "CARD1" ends to detect the end tag "</card>" of "CARD1", the screen shown in FIG. 10(a) is displayed on the LCD 140 of the communication terminal device according to the second embodiment. The user, accordingly, is allowed to read the contents of "CARD1" at time $T_{14}$ even when the contents data is being received on the LCD 140. Then, scroll the display screen by SW operation to display, for example, such screens as illustrated in FIG. 10 (b) and (c).

Figure 11:
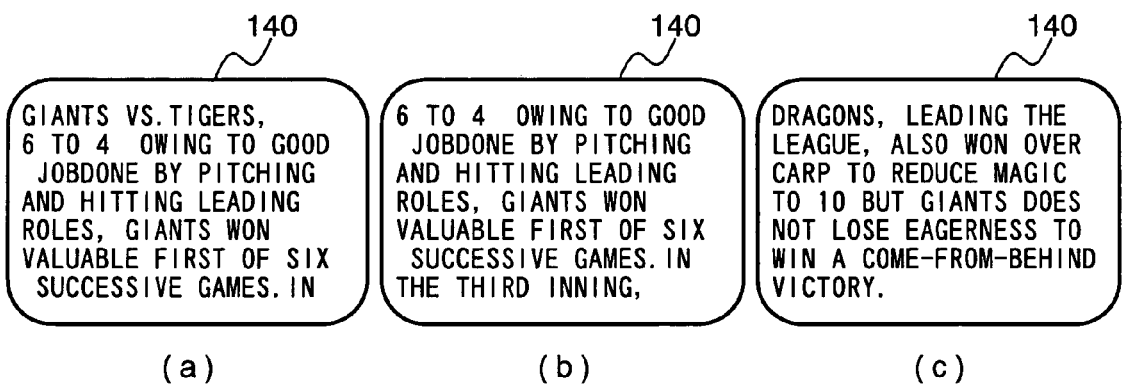
FIG. 11 is an explanatory diagram showing one example of a screen image of "CARD2" in the second embodiment.

FIG. 11 shows one example of a screen image of "CARD2" on the LCD of the communication terminal device according to the second embodiment. (a) of the figure shows a screen image of "CARD2". (b) of the figure shows a screen image obtained by scrolling "CARD2" by one line. (c) of the figure shows a screen image obtained by scrolling "CARD2" up to the final line. As shown in FIG. 9, when at time $T_{15}$, browsing of "CARD2" ends to detect the end tag "</card>" of "CARD2", the screen shown in FIG. 11(a) is displayed on the LCD 140 of the communication terminal device according to the second embodiment. The user, accordingly, is allowed to read the contents of "CARD2" at time $T_{15}$ even when the contents data is being received on the LCD 140. Then, scroll the display screen by SW operation to display, for example, such screens as illustrated in FIGS. 11 (b) and (c).

Figure 12:
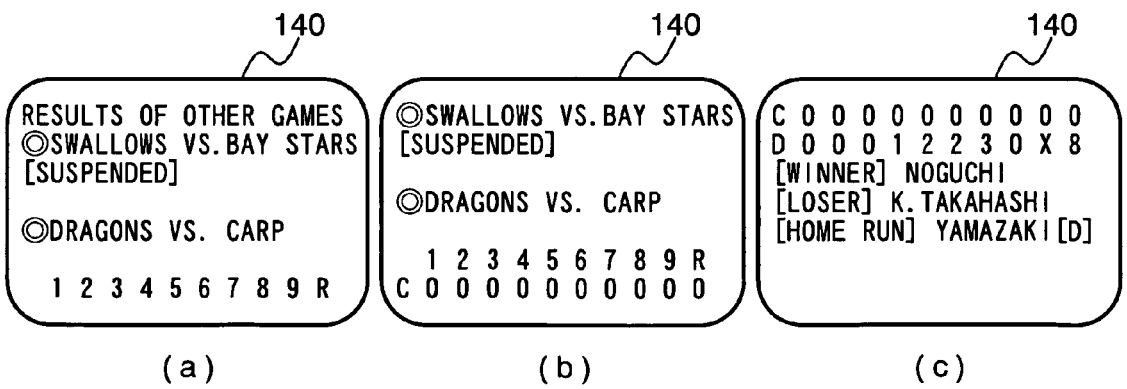
FIG. 12 is an explanatory diagram showing one example of a screen image of "CARD3" in the second embodiment.

FIG. 12 shows one example of a screen image of "CARD3" on the LCD of the communication terminal device according to the second embodiment. (a) of the figure shows a screen image of "CARD3". (b) of the figure shows a screen image obtained by scrolling "CARD3" by one line. (c) of the figure shows a screen image obtained by scrolling "CARD3" up to the final line. As shown in FIG. 9, when at time $T_{13}$, browsing of "CARD3" ends to detect the end tag "</card>" of "CARD3", the screen shown in FIG. 12(a) is displayed on the LCD 140 of the communication terminal device according to the second embodiment. Then, scroll the display screen by SW operation to display, for example, such screens as illustrated in FIGS. 12 (b) and (c).

When the contents data described in WML is once all received on a "DECK" basis, if scroll operation is further made by SW operation, for example, on the screen shown in FIG. 10(c) in which the final line of "CARD1" is displayed, the data is displayed starting with the first line of "CARD2" shown in FIG. 11(a), and "DECK" composed of the respective "CARD" can be read as one contents data.

Thus, with the communication terminal device according to the second embodiment, in a case where the contents data is divided on a "CARD" basis as in an WAP system, since the backlight is turned on upon detection of the end tag of each "CARD", such a situation can be avoided that unless reception of all the contents data is finished, "CARD"-basis contents which is originally displayable can not be read, whereby power consumption can be appropriately reduced without deteriorating user's ease of use. Furthermore, optimum backlight control better meeting conditions of use by a user can be realized by selecting either an end tag of the entire contents data or an end tag of each "CARD" to turn on the backlight when the selected end tag is detected.

First Modification

Although in the communication terminal device according to the first embodiment, when the start of reception of the data communication is not detected at Step S109 of FIG. 4, time out of the timer unit is monitored to turn off the backlight, the present invention is not limited thereto. A communication terminal device according to a first modification is structured to, for the reception of the data communication, monitor the start of reception of the data communication with the backlight turned on.

Since the communication terminal device according to the first modification is the same in structure as the communication terminal device according to the first embodiment, no illustration and description thereof will be made here.

Figure 13:
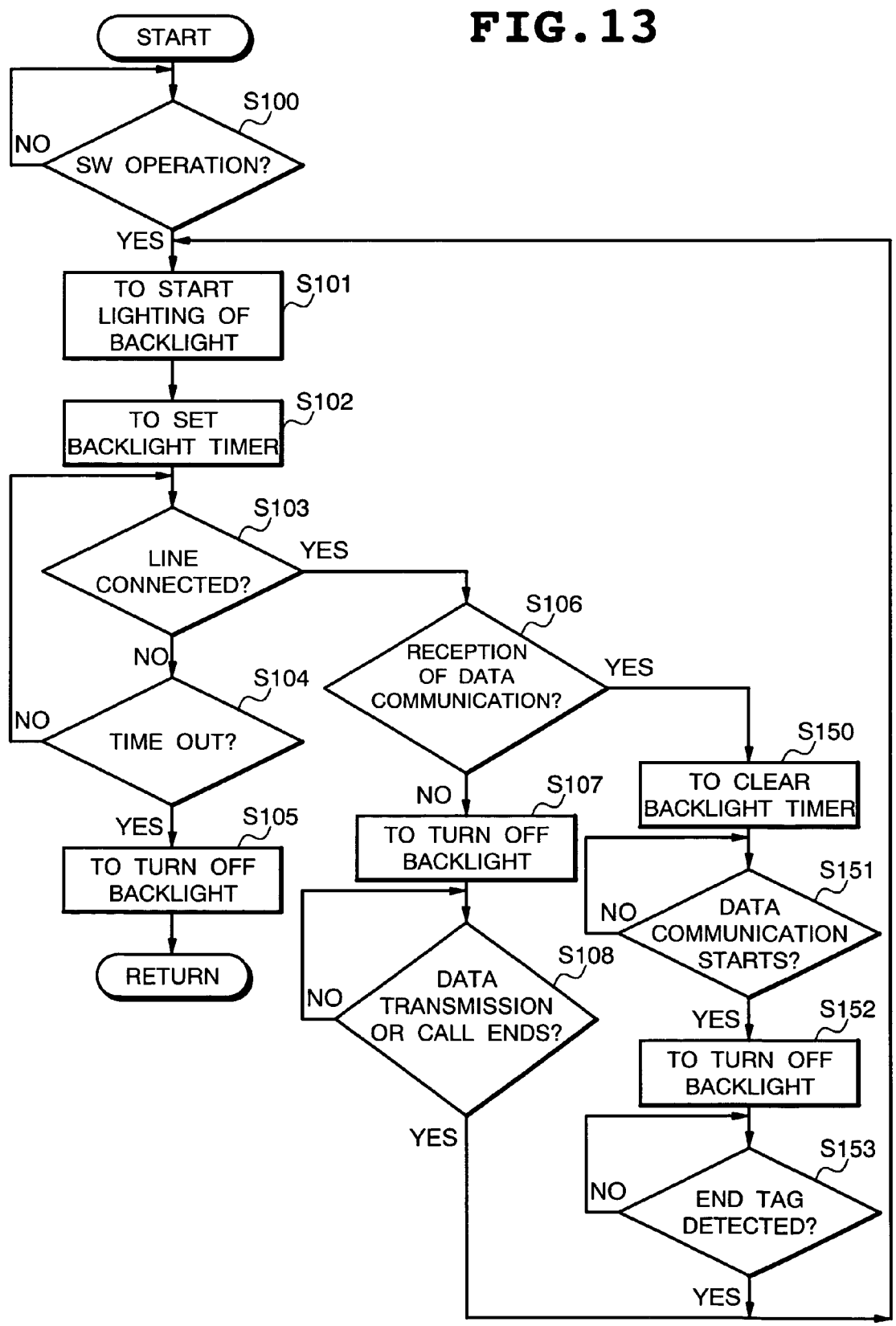
FIG. 13 is a flow chart showing an outline of processing contents of backlight lighting control of the communication terminal device according to a first modification.
Figure 14:
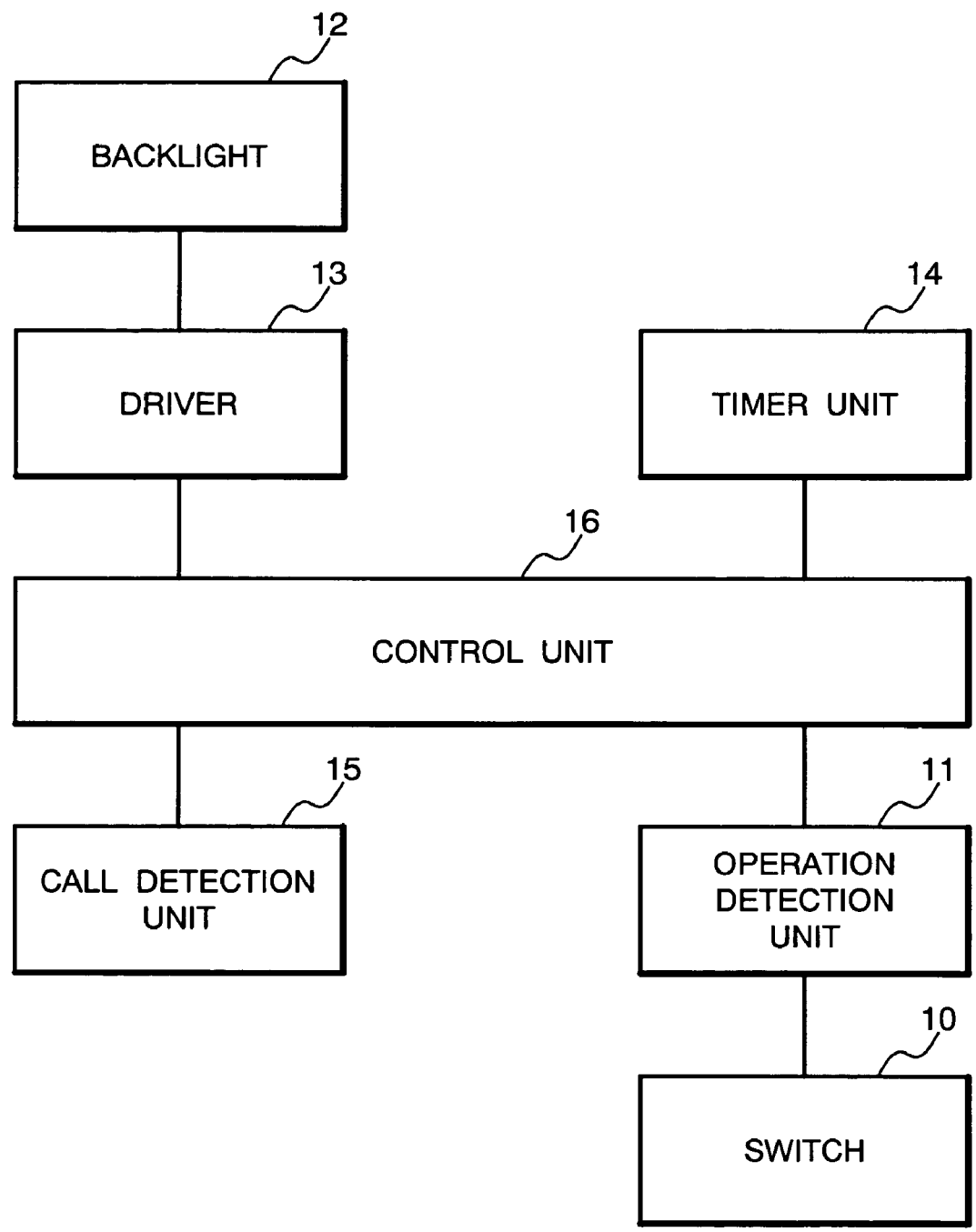
FIG. 14 is a block diagram showing an outline of a structure of a conventional communication terminal device.
Figure 15:
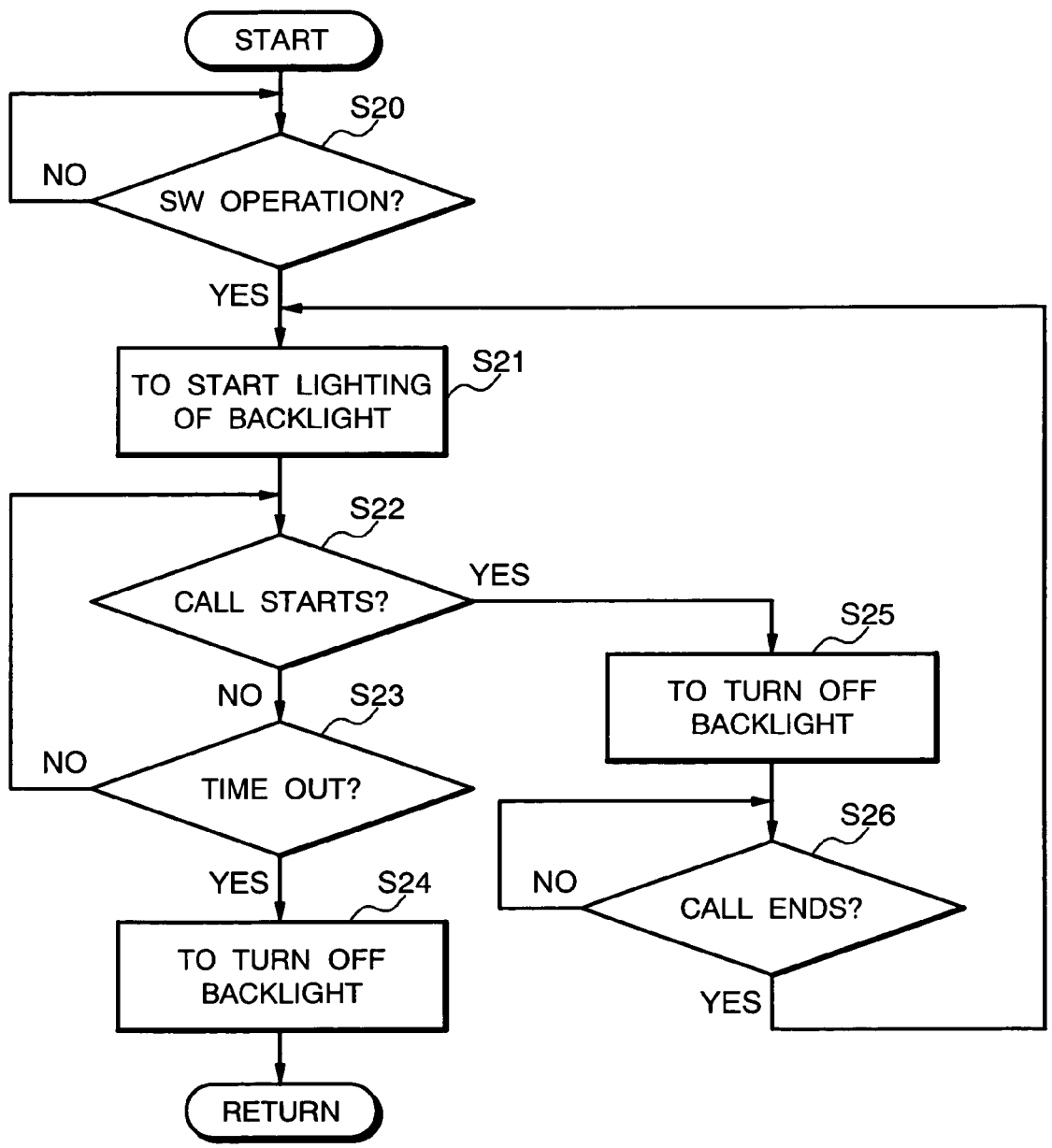
FIG. 15 is a flow chart showing an outline of processing contents of backlight lighting control of the conventional communication terminal device.

FIG. 13 shows an outline of the processing contents of a program for controlling lighting of a backlight in the communication terminal device according to the first modification. The same parts as those of the backlight lighting control program of the communication terminal device according to the first embodiment shown in FIG. 4 are indicated by the same reference numerals to omit their description. More specifically, when the determination is made at Step S106 that reception of the data communication is to be conducted (Step S106: Y), clear the backlight timer value set at Step S102 to stop counting of the timer unit 36 (Step S150) and monitor whether the reception of the data communication is started (Step S151: N). When the determination is made that the reception of the data communication is started (Step S151: Y), turn off the backlight 34 through the driver 35 (Step S152). Subsequently, detect a predetermined end tag set by HTML or WML by means of the end tag detection unit 40 (Step S153: N). Then, upon detection of the end tag by the end tag detection unit 40 (Step S153: Y), return to Step S101 to start lighting of the backlight 34 again.

Thus, since the communication terminal device according to the first modification is structured to, for conducting reception of the data communication, monitor the start of the reception of the data communication with the backlight turned on, there is little time difference between classification of data communication and start of data communication in many cases and the device therefore conducts none of time out monitoring processing only for the little time difference, whereby backlight lighting control can be simplified in a communication terminal device whose control program capacity is limited.

Second Modification

In a communication terminal device according to a second modification, at Steps 106 and 109 of FIG. 4 in the first embodiment and at Steps S106 and 151 in FIG. 13, a little time difference is provided between the start of the reception of the data communication and turn-off of the backlight.

More specifically, after Step S106 in FIGS. 4 and 13, count a first wait time set in advance and turn off the backlight through the driver when the time out is detected. In addition, when the start of the reception of the data communication is detected at Step S109 in FIG. 4 and Step S151 in FIG. 13, count a second wait time set in advance to turn off the backlight through the driver when the time out is detected. As a result, the user is allowed to confirm the start of the data communication by visual observation only by watching the LCD for a fixed time after the reception of the data communication is started, thereby improving user's ease of use.

Although the communication terminal devices according to the first and the second embodiments and according to the first and the second modifications have their consumption of electric currents reduced by turning off a backlight, the present invention is not limited thereto. For example, a communication terminal device having a sidelight function may achieve the same effect by turning off a sidelight. Wasteful consumption of electric currents may also be reduced not only by turning off a backlight but also by stopping supply of power to an LCD itself.

Although the first and the second embodiments and the first and the second modification have been described assuming that the communication terminal devices are portable telephones, the present invention is not limited thereto. The present invention may be applied, for example, to various kinds of communication terminals such as personal digital assistants (PDA).

As described in the foregoing, since the present invention is structured to avoid unnecessary electric currents conventionally wastefully consumed by the lighting of a display means before data processing for generating display information such as browsing processing is finished after the end of reception of data communication, reduction in power consumption of a communication terminal device can be achieved which will be more and more frequently used for data communication such as reception of contents data.

In addition, since according to the present invention, it is unnecessary to watch a display means while calling, wasteful consumption of electric current during the time can be reduced.

Furthermore, the present invention can be applied to such existing or future systems as an Internet system and a WAP system with ease.

Moreover, according to the present invention, since when one contents data is divided on the basis of a plurality of cards, light-emission of a light-emitting means is started upon detection of an end tag of each card, such a situation can be avoided that unless all the contents data are received, contents data on a card basis which can be originally displayed can not be read, thereby appropriately reducing power consumption without deteriorating user's ease of use.

Also, since according to the present invention, light-emission of a light-emitting means is started after receiving contents data described in a wireless markup language and detecting a card end tag indicative of the end of each card, a communication terminal device applied to a WAP system is allowed to avoid wasteful consumption of electric currents required for light-emission of the light-emitting means during a time from completion of the reception of contents data until the end of browsing.

Furthermore, according to the present invention, since either detecting an end tag indicative of the end of contents or detecting a card end tag indicative of the end of each card can be set in advance, optimum lighting control better meeting user's conditions of use is possible.

Moreover, according to the present invention, since light emission of a light-emitting means is stopped after a lapse of a preset lighting time since the application of operation information, useless electric current can be reduced which is consumed after a lapse of time when user's possibility of watching a display means is decreased.

Furthermore, since the present invention is structured to stop light-emission of a light-emitting means after a lapse of a predetermined wait time, users are allowed to confirm the start of data communication by visual observation only by watching a display means for a fixed time period after the start of reception of the data communication, thereby further improving user's ease of use.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A communication terminal device comprising:
   display means for displaying information such as characters;
   input means for receiving input of operation information;
   processing means for generating said information based on operation information of the input means; and
   light-emitting means for lighting at least either said display means or said input means;
   reception means for receiving data described in a predetermined information description language based on said operation information;
   code detection means for detecting a predetermined code indicative of the end of data received by the reception means; and
   light-emission control means for stopping light-emission by said light-emitting means upon start of the reception of said data by said reception means and starting light-emission by said light-emitting means upon detection of said predetermined code by said code detection means.

2. The communication terminal device as set forth in claim 1, comprising:
   communication type determination means for determining whether call is to be made by voice information or said data is to be received, and
   light-emission control means for, when the determination is made by said communication type determination means that said call is to be made, stopping light-emission by said light-emitting means upon start of said call and starting light-emission by said light-emitting means upon end of said call and when the determination is made by said communication type determination means that said data is to be received, stopping light-emission by said light-emitting means upon start of the reception of said data by said reception means and starting light-emission by said light-emitting means upon detection of said predetermined code by said code detection means.

3. The communication terminal device as set forth in claim 1, comprising:
   time counting means for starting counting time from when said operation information is input by said input means, and
   light-emission stop means for stopping light-emission by said light-emitting means when time counted by the time counting means exceeds a lighting time set in advance.

4. The communication terminal device as set forth in claim 1, comprising:
   communication type determination means for determining whether call is to be made by voice information or said data is to be received,
   light-emission control means for, when the determination is made by said communication type determination means that said call is to be made, stopping light-emission by said light-emitting means upon start of said call and starting light-emission by said light-emitting means upon end of said call and when the determination is made by said communication type determination means that said data is to be received, stopping light-emission by said light-emitting means upon start of the reception of said data by said reception means and starting light-emission by said light-emitting means upon detection of said predetermined code by said code detection means,
   time counting means for starting counting time from when said operation information is input by said input means, and
   light-emission stop means for stopping light-emission by said light-emitting means when time counted by the time counting means exceeds a lighting time set in advance.

5. The communication terminal device as set forth in claim 1, wherein
   said reception means receives data described in an information description language such as a hypertext markup language or a wireless markup language, and said code detection means detects a predetermined end tag indicative of the end of data received by said reception means.

6. The communication terminal device as set forth in claim 1, wherein
said reception means receives data described in an information description language such as a hypertext markup language or a wireless markup language, and said code detection means detects a predetermined end tag indicative of the end of data received by said reception means, and which further comprises:
time counting means for starting counting time from when said operation information is input by said input means, and
light-emission stop means for stopping light-emission by said light-emitting means when time counted by the time counting means exceeds a lighting time set in advance.

7. The communication terminal device as set forth in claim 1, comprising:
communication type determination means for determining whether call is to be made by voice information or said data is to be received, and
light-emission control means for, when the determination is made by said communication type determination means that said call is to be made, stopping light-emission by said light-emitting means upon start of said call and starting light-emission by said light-emitting means upon end of said call and when the determination is made by said communication type determination means that said data is to be received, stopping light-emission by said light-emitting means upon start of the reception of said data by said reception means and starting light-emission by said light-emitting means upon detection of said predetermined code by said code detection means, wherein
said reception means receives data described in an information description language such as a hypertext markup language or a wireless markup language, and said code detection means detects a predetermined end tag indicative of the end of data received by said reception means.

8. The communication terminal device as set forth in claim 1, comprising:
communication type determination means for determining whether call is to be made by voice information or said data is to be received,
light-emission control means for, when the determination is made by said communication type determination means that said call is to be made, stopping light-emission by said light-emitting means upon start of said call and starting light-emission by said light-emitting means upon end of said call and when the determination is made by said communication type determination means that said data is to be received, stopping light-emission by said light-emitting means upon start of the reception of said data by said reception means and starting light-emission by said light-emitting means upon detection of said predetermined code by said code detection means,
time counting means for starting counting time from when said operation information is input by said input means, and
light-emission stop means for stopping light-emission by said light-emitting means when time counted by the time counting means exceeds a lighting time set in advance, wherein said reception means receives data described in an information description language such as a hypertext markup language or a wireless markup language, and said code detection means detects a predetermined end tag indicative of the end of data received by said reception means.

9. The communication terminal device as set forth in claim 1, wherein
said light-emission control means, at the time of stopping light-emission by said light-emitting means, stops light-emission after a lapse of a predetermined wait time.

10. The communication terminal device as set forth in claim 1, wherein the interval between said stopping of light-emission by said light-emitting means and said starting of light-emission by said light-emitting means is configured such that said light-emission does not appear to be continuous.

11. A communication terminal device comprising:
display means for displaying information such as characters;
input means for receiving input of operation information;
processing means for generating said information based on operation information of the input means; and
light-emitting means for lighting at least either said display means or said input means;
reception means for receiving data described in a predetermined information description language expressing one data by a plurality of cards based on said operation information;
code detection means for detecting a card end tag indicative of the end of each said card of the data received by the reception means; and
light-emission control means for stopping light-emission by said light-emitting means upon start of the reception of said data by said reception means and starting light-emission by said light-emitting means upon detection of said card end tag by said code detection means.

12. The communication terminal device as set forth in claim 11, further comprising
detection tag setting means for in advance setting either an end tag indicative of the end of said data or a card end tag indicative of the end of each said card to be detected, wherein
said code detection means detects a tag set by said detection tag setting means from the data received by said reception means, and
said light-emission control means stops light-emission by said light-emitting means upon start of the reception of said data by said reception means and starts light-emission by said light-emitting means upon detection of a tag set by said detection tag setting means by means of said code detection means.

13. The communication terminal device as set forth in claim 11, wherein
said reception means receives data described in a wireless markup language, and which further comprises
detection tag setting means for in advance setting either an end tag indicative of the end of said data or a card end tag indicative of the end of each said card to be detected, and wherein
said code detection means detects a tag set by said detection tag setting means from the data received by said reception means, and
said light-emission control means stops light-emission by said light-emitting means upon start of the reception of said data by said reception means and starts light-emission by said light-emitting means upon detection of a tag set by said detection tag setting means by means of said code detection means.

14. The communication terminal device as set forth in claim 11, comprising:
   time counting means for starting counting time from when said operation information is input by said input means, and
   light-emission stop means for stopping light-emission by said light-emitting means when time counted by the time counting means exceeds a lighting time set in advance.

15. The communication terminal device as set forth in claim 11, comprising:
   time counting means for starting counting time from when said operation information is input by said input means, and
   light-emission stop means for stopping light-emission by said light-emitting means when time counted by the time counting means exceeds a lighting time set in advance, wherein
   said reception means receives data described in a wireless markup language.

16. The communication terminal device as set forth in claim 11, comprising:
   time counting means for starting counting time from when said operation information is input by said input means,
   light-emission stop means for stopping light-emission by said light-emitting means when time counted by the time counting means exceeds a lighting time set in advance, and
   detection tag setting means for in advance setting either an end tag indicative of the end of said data or a card end tag indicative of the end of each said card to be detected, wherein
   said code detection means detects a tag set by said detection tag setting means from the data received by said reception means, and
   said light-emission control means stops light-emission by said light-emitting means upon start of the reception of said data by said reception means and starts light-emission by said light-emitting means upon detection of a tag set by said detection tag setting means by means of said code detection means.

17. The communication terminal device as set forth in claim 11, wherein
   said light-emission control means, at the time of stopping light-emission by said light-emitting means, stops light-emission after a lapse of a predetermined wait time.

18. The communication terminal device as set forth in claim 11, wherein
   said reception means receives data described in a wireless markup language.

19. The communication terminal device as set forth in claim 11, wherein the interval between said stopping of light-emission by said light-emitting means and said starting of light-emission by said light-emitting means is configured such that said light-emission does not appear to be continuous.

20. A display control method in a communication terminal device having display means for displaying information such as characters, input means for receiving input of operation information, processing means for generating said information based on operation information of the input means, and light-emitting means for lighting at least either said display means or said input means, comprising the steps of:
   receiving data described in a predetermined information description language based on said operation information;
   detecting a predetermined code indicative of the end of received data; and
   stopping light-emission by said light-emitting means upon start of the reception of said data and starting light-emission by said light-emitting means upon detection of said predetermined code.

21. The display control method in a communication terminal device as set forth in claim 20, comprising the steps of:
   determining whether call is to be made by voice information or said data is to be received, and
   when the determination is made that said call is to be made, stopping light-emission by said light-emitting means upon start of said call and starting light-emission by said light-emitting means upon end of said call and when the determination is made that said data is to be received, stopping light-emission by said light-emitting means upon start of the reception of said data and starting light-emission by said light-emitting means upon detection of said predetermined code.

22. The display control method in a communication terminal device as set forth in claim 20, comprising the steps of:
   counting the time from when said operation information is input by said input means, and
   stopping light-emission by said light-emitting means when counted time exceeds a lighting time set in advance.

23. The display control method in a communication terminal device as set forth in claim 20, wherein the interval between said stopping of light-emission by said light-emitting means and said starting of light-emission by said light-emitting means is configured such that said light-emission does not appear to be continuous.

24. A display control method in a communication terminal device having display means for displaying information such as characters, input means for receiving input of operation information, processing means for generating said information based on operation information of the input means, and light-emitting means for lighting at least either said display means or said input means, comprising the steps of:
   receiving data described in a predetermined information description language expressing one data by a plurality of cards based on said operation information;
   detecting a card end tag indicative of the end of each said card of received data; and
   stopping light-emission by said light-emitting means upon start of the reception of said data and starting light-emission by said light-emitting means upon detection of said card end tag.

25. The display control method in a communication terminal device as set forth in claim 24, wherein
   data described in a wireless markup language is received.

26. The display control method in a communication terminal device as set forth in claim 24, further comprising the steps of:
   in advance setting either an end tag indicative of the end of said data or a card end tag indicative of the end of each said card to be detected,
   detecting a set tag from received data, and stopping light-emission by said light-emitting means upon start of the reception of said data and starting light-emission by said light-emitting means upon detection of a set tag.

27. The display control method in a communication terminal device as set forth in claim 24, further comprising the steps of:
counting time from when said operation information is input by said input means, and
stopping light-emission by said light-emitting means when counted time exceeds a lighting time set in advance.

28. The display control method in a communication terminal device as set forth in claim 24, wherein the interval between said stopping of light-emission by said light-emitting means and said starting of light-emission by said light-emitting means is configured such that said light-emission does not appear to be continuous.

29. A communication terminal device comprising:
a display that displays information;
an operator's panel that receives input of operation information;
a processor that generates said information based on said operation information;
a light-emitting circuit that lights said display or said operator's panel;
a receiving circuit that receives data described in a predetermined description language based on said operation information;
a detecting circuit that detects a predetermined code indicative of the end of data received by said receiving circuit; and
a controller unit that stops lighting by said light-emitting circuit upon start of the reception of said data by said receiving circuit and starts lighting by said light-emitting circuit upon detecting said predetermined code by said detecting circuit.

30. The communication terminal device according to claim 29, wherein the controller unit is configured so that interval between said stopping lighting by said light-emitting circuit and said starting lighting by said light-emitting circuit is configured such that said lighting does not appear to be continuous.

* * * * *